United States Patent [19]
Tanabe et al.

[11] Patent Number: 5,930,070
[45] Date of Patent: Jul. 27, 1999

[54] TAPE LOADING APPARATUS FOR LOADING A MAGNETIC TAPE IN A MAGNETIC RECORDING AND REPRODUCING SYSTEM

[75] Inventors: Kazunori Tanabe; Shoji Kawahara, both of Okayama; Kenji Sasaki, Kyoto; Ichiro Senda, Toyonaka; Kouzou Taba, Osaka; Masayuki Akieda, Moriguchi, all of Japan

[73] Assignee: Matsushita Electric Industrial Co., Ltd., Kadoma, Japan

[21] Appl. No.: 08/881,101

[22] Filed: Jun. 24, 1997

[30] Foreign Application Priority Data

| Jun. 27, 1996 | [JP] | Japan | 8-167006 |
| Jun. 27, 1996 | [JP] | Japan | 8-167008 |
| Aug. 5, 1996 | [JP] | Japan | 8-205658 |
| Aug. 7, 1996 | [JP] | Japan | 8-208138 |
| Sep. 18, 1996 | [JP] | Japan | 8-245858 |

[51] Int. Cl.$^6$ .................................................. G11B 5/027
[52] U.S. Cl. ................................................................ 360/85
[58] Field of Search .......................................... 360/85, 95

[56] References Cited

U.S. PATENT DOCUMENTS

| 4,672,476 | 6/1987 | Saito | 360/85 |
| 4,807,065 | 2/1989 | Kwon | 360/85 |
| 4,975,793 | 12/1990 | Oka | 360/85 |
| 5,349,485 | 9/1994 | Lin | 360/85 |
| 5,430,585 | 7/1995 | Takada | 360/85 |
| 5,444,585 | 8/1995 | Baek | 360/85 |
| 5,475,546 | 12/1995 | Choi | 360/85 |

*Primary Examiner*—A. J. Heinz
*Attorney, Agent, or Firm*—Wenderoth, Lind & Ponack, L.L.P.

[57] ABSTRACT

A magnetic recording and reproducing system including a reel base for supplying or taking up a tapelike magnetic recording medium, and a tension band for braking the reel base, which is wound around the reel base through a predetermined angle. First and second retainers are provided for holding opposite ends of the tension band, respectively. The first and second retainers are pivotally attached to a pivotal tension arm. The tension arm has a tension post so that the magnetic recording medium is brought into sliding contact with the tension post. An urging member is provided for adjusting the tension of the magnetic recording medium to a desired value. The system also includes a control member which has a contact portion capable of being brought into contact with a guide portion of the second retainer. Also, a guide member is provided for guiding the control member to first and second positions where the contact portion of the control member is brought into and out of contact with the guide portion of the second retainer, respectively.

18 Claims, 19 Drawing Sheets

TAPE LOADING APPARATUS FOR LOADING A MAGNETIC TAPE IN A MAGNETIC RECORDING AND REPRODUCING SYSTEM

BACKGROUND OF THE INVENTION

The present invention generally relates to a magnetic recording and reproducing system such as a video tape recorder (VTR) and a digital audio tape recorder (DAT), in which a tapelike magnetic recording medium is wound around a rotary cylinder having a magnetic head mounted thereon so as to be fed therearound such that recording and reproduction of signals can be performed.

Initially, a known reel base braking mechanism is described. At a supply reel base, a tension regulating mechanism, a main brake mechanism, a soft brake mechanism and three control mechanism for controlling the tension regulating mechanism, the main brake mechanism and the soft brake mechanism, respectively independently of one another are required to be provided.

The tension regulating mechanism includes a pivotal tension arm having a tension post attached thereto, a tension band which is wound around the supply reel base and at least one end of which is attached to the tension arm and a spring member for imparting a moment to the tension arm. By optimizing back tension of a magnetic tape during its running, the tension regulating mechanism optimizes contact pressure of the magnetic tape relative to a rotary head mounted on a rotary cylinder.

The main brake mechanism includes an arm to which a block type brake shoe is attached and a spring member. At the time of stop of fast feed and rewinding of the magnetic tape, the main brake mechanism overcomes inertia of the supply reel having the magnetic tape wound therearound so as to stop rotation of the magnetic tape in a short period.

The soft brake mechanism includes an arm and a spring member. In order to prevent slack of the magnetic tape during loading of the magnetic tape, the soft brake mechanism depresses a tension band against the supply reel base so as to apply a small braking force to the supply reel base.

On the other hand, at a take-up reel base, a main brake mechanism having the same function and arrangement as those of the main brake mechanism provided at the supply reel base, a soft brake mechanism and two control mechanisms for controlling the main brake mechanism and the soft brake mechanism, respectively independently of each other are required to be provided. The soft brake mechanism at the take-up reel base includes an arm to which a block type brake shoe is fixed and a spring member and is designed to apply a small braking force to the take-up reel base so as to prevent slack of the magnetic tape at the time of loading or reverse reproduction of the magnetic tape.

Therefore, the number of components of the above mentioned mechanisms is quite large, thereby resulting in substantial rise of production cost of the known reel base braking mechanism. Meanwhile, since the many block type brake shoes are employed, braking force applied to the reel base is unstable and thus, the magnetic tape is readily damaged undesirably.

Then, a prior art tape cassette loading apparatus is described. In a conventional tape cassette loading apparatus of a type in which by using a pivotal arm (wiper arm), a tape cassette partially projecting out of the tape cassette loading apparatus is displaced substantially horizontally so as to be drawn into the tape cassette loading apparatus and then, is displaced vertically so as to be loaded at a predetermined position of the prior art tape cassette loading apparatus, speed reduction ratio from a DC motor acting as a driving source to the wire arm is constant. Therefore, in order to prevent increase of variations of driving load and feed rate of the magnetic tape between cassette loading for lowering the tape cassette vertically and cassette unloading for lifting the tape cassette vertically, a lever mechanism is required to be provided additionally. The lever mechanism includes an arm for not only hindering vertical descent of the tape cassette but promoting vertical ascent of the tape cassette and a spring member for applying an urging force to the arm. Therefore, production cost of the prior art tape cassette loading apparatus is raised due to increase of the number of its components and the number of its assembly steps.

Meanwhile, also in a speed reduction mechanism for driving the tape cassette loading apparatus which is constituted by the above mentioned DC motor, a plurality of gears, a main cam gear, a driving rack and the wiper arm, since a displacement angle of a worm gear mounted on an output shaft of the DC motor is set small, self-locking of the worm gear occurs. Hence, when the tape cassette projecting out of the tape cassette loading apparatus is pushed into the tape cassette loading apparatus, a spring member for defining the pushing force should be provided between the main cam gear and the wiper arm. In addition, a mechanism for detecting that the tape cassette has been pushed into the tape cassette loading apparatus and a detection means are required to be provided. As a result, production cost of the speed reduction mechanism is raised due to the number of its components.

Especially, the above mentioned detection means is required to be set to be detectable even when the power source is in OFF state. Therefore, in case an optical detection means is used as the detection means, the optical detection means should be subjected to on-off control so as to lengthen its service life and shorten period of its ON state. In this case, such a problem arises that response time from push of the tape cassette into the tape cassette loading apparatus to start of drawing of the tape cassette into the tape cassette loading apparatus is long.

Then, a conventional tape loading mechanism is described. An improved conventional tape loading mechanism includes a sector gear for driving a link mechanism for driving a tape guide and an operational mode switching means formed integrally with a rack. The sector gear and the operational mode switching means are provided on a lower face of a chassis such that the sector gear is rotationally driven by displacing the operational mode switching means. A regulation member is required to be provided for regulating rotation of the sector gear even if the operational mode switching means is further displaced upon completion of tape loading for the purpose of switching operational mode of a magnetic recording and reproducing system. Thus, such a drawback is incurred that the operational mode switching means is made larger in size. Furthermore, the improved conventional tape loading mechanism cannot be structurally applied to a reel base driving mechanism of a so-called "in-cassette" type in which a capstan is provided in a cassette mouth and the number of its components can be minimized, thereby resulting in restraints on design of the magnetic recording and reproducing system.

SUMMARY OF THE INVENTION

Accordingly, an essential object of the present invention is to provide, with a view to eliminating the above mentioned disadvantages of prior art, a magnetic recording and reproducing system in which damage to a magnetic tape can be prevented and its production cost can be lowered greatly through substantial reduction of the number of its components.

In order to accomplish this object of the present invention, a magnetic recording and reproducing system according to the present invention comprises: a reel base for supplying or taking up a tapelike magnetic recording medium; a tension band for braking the reel base, which is wound around the reel base through a predetermined angle; a first retainer for holding one end of the tension band; a second retainer for holding the other end of the tension band, which has a guide portion; a tension arm to which the first and second retainers are pivotally provided and which is pivotally provided; the tension arm having a tension post such that the magnetic recording medium is brought into sliding contact with the tension post during running of the magnetic recording medium; an urging means whose one end is attached to the tension arm so as to adjust tension of the magnetic recording medium to a desired value during running of the magnetic recording medium for recording or reproduction in the magnetic recording and reproducing system; a control member to which the other end of the urging means is attached and which has a contact portion capable of being brought into contact with the guide portion of the second retainer so as to be brought into or out of contact with the guide portion of the second retainer; and a guide means for guiding the control member to a first position where the contact portion of the control member is brought into contact with the guide portion of the second retainer and a second position where the contact portion of the control member is brought out of contact with the guide portion of the second retainer.

In a supply reel base braking mechanism of the magnetic recording and reproducing system of the present invention, since an elastic force adjusting member which adjusts magnitude of moment applied to the tension arm by changing length of a tension coiled spring stretched between the tension arm and the elastic force adjusting member so as to control tension of the magnetic tape is brought into contact, at the time of loading of a tape cassette and during loading of the magnetic tape, with a cam face of the retainer for attaching the tension band to the tension arm, slack of the magnetic tape and damage to the magnetic tape can be prevented and its production cost can be lowered a great deal through large reduction of the number of its components.

In a take-up reel base braking mechanism of the magnetic recording and reproducing system of the present invention, including a brake band wound around a take-up reel base, a first arm to which one end of a tension coiled spring is attached and which can be pivoted to a position where tension is applied to the brake band by the tension coiled spring so as to brake the take-up reel base and a further position where tension is not applied to the brake band regardless of magnitude of force of the tension coiled spring, a second arm to which the other end of the tension coiled spring is attached and which adjusts length of the tension coiled spring by being pivoted so as to adjust braking force of the take-up reel base and an operational mode switching means which is capable of controlling pivotal positions of the first and second arms, its construction is simplified and damage to the magnetic tape can be prevented by applying predetermined braking force to the take-up reel base at predetermined timing.

Meanwhile, in a tape cassette loading apparatus of the magnetic recording and reproducing system of the present invention, including a wiper arm which is pivoted so as to drive in predetermined direction a cassette holder holding the tape cassette and includes an eccentric gear and a drive rack which is displaced straight and has an internal gear in mesh with the eccentric gear, speed reduction ratio can be changed gradually in response to movement of the cassette holder, variations of drive load and speed of travel of the cassette holder can be reduced. In addition, its production cost can be lowered through reduction of the number of its components.

Furthermore, if the tape cassette loading apparatus of the magnetic recording and reproducing system of the present invention is provided with a mechanism in which when the tape cassette is depressed into the magnetic recording and reproducing system at the time of loading of the tape cassette, a main cam for changing operational mode of the whole magnetic recording and reproducing system is rotated and a mode switch for detecting rotational angle of the main cam, insertion of the tape cassette into the magnetic recording and reproducing system is detected by the mode switch, so that its control is simplified, its response is improved and its production cost is reduced.

Moreover, in a tape loading mechanism of the magnetic recording and reproducing system of the present invention, including a loading rack which is disposed between a loading gear and a main lever acting as a drive member and is displaced together with the main lever during loading of the magnetic tape and is stopped at a predetermined position upon completion of loading of the magnetic tape so as to be held at the predetermined position, its components can be made more compact and lighter.

BRIEF DESCRIPTION OF THE DRAWINGS

These objects and features of the present invention will become apparent from the following description taken in conjunction with the preferred embodiments thereof with reference to the accompanying drawings, in which.

Before the description of the present invention proceeds, it is to be noted that like parts are designated by like reference numerals throughout several views of the accompanying drawings.

DETAILED DESCRIPTION OF THE INVENTION

Figure 1:
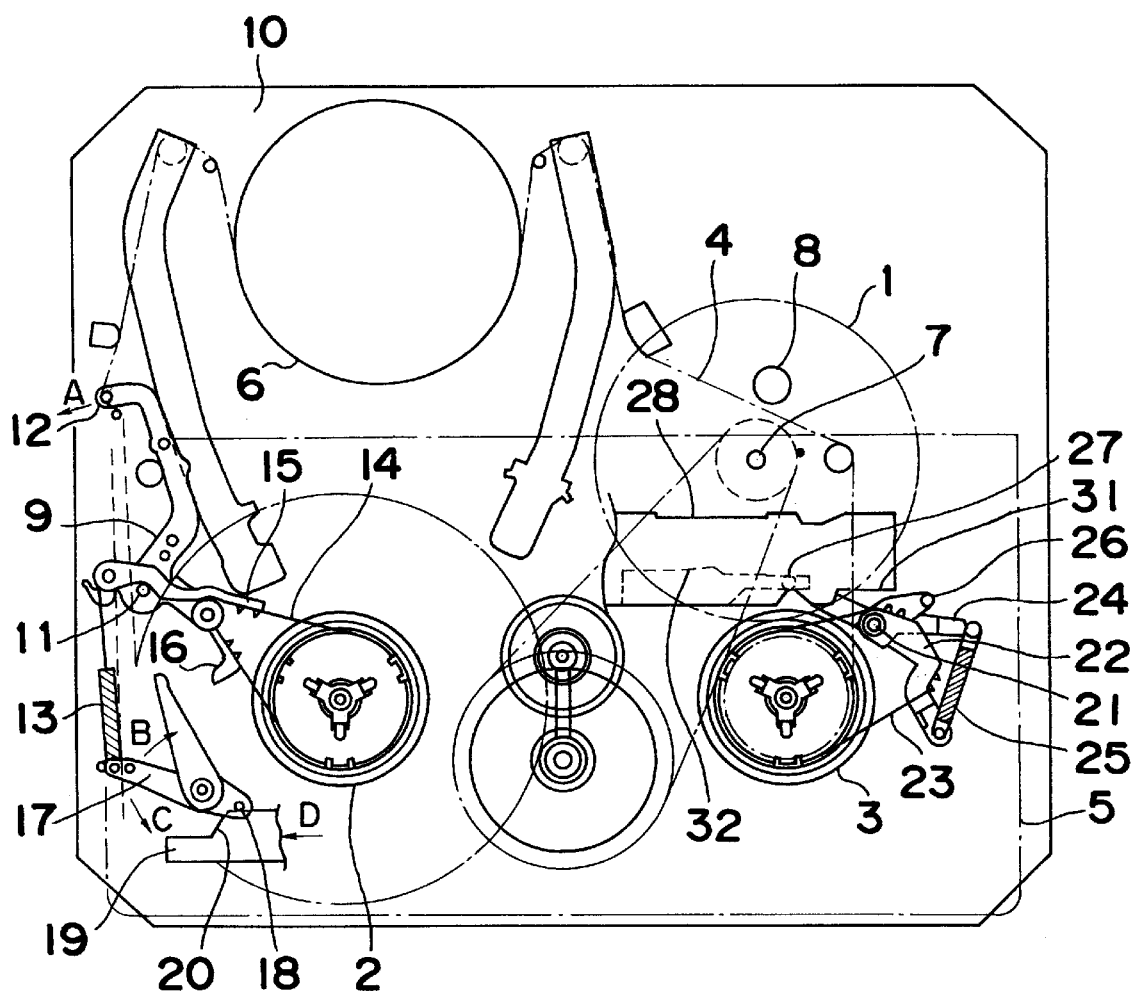
FIG. 1 is a top plan view of a reel base braking mechanism of a magnetic recording and reproducing system according to one embodiment of the present invention.
Figure 2:
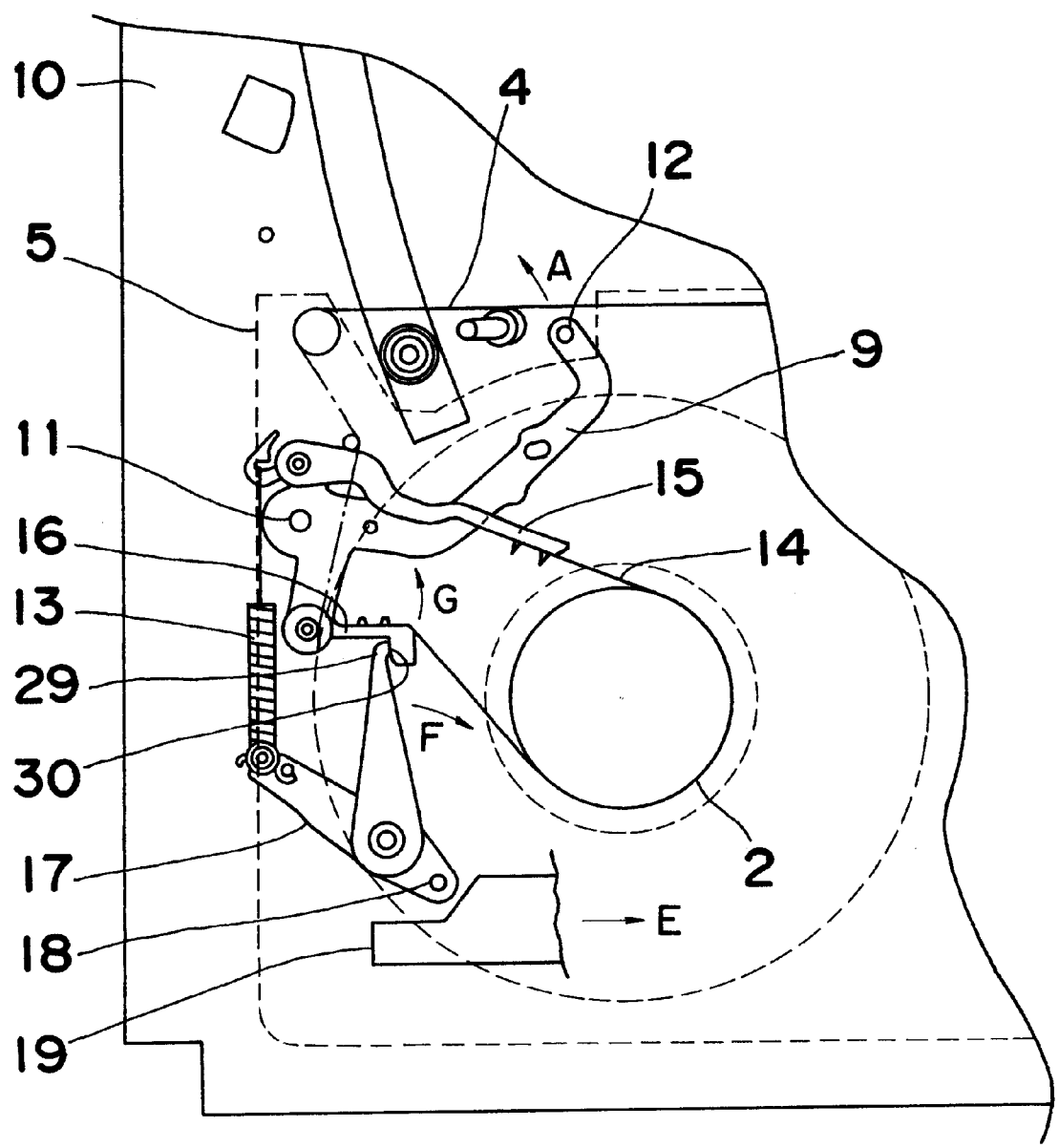
FIG. 2 is a top plan view showing a supply reel base braking mechanism of the reel base braking mechanism of FIG. 1 at the time of start of tape loading.
Figure 3:
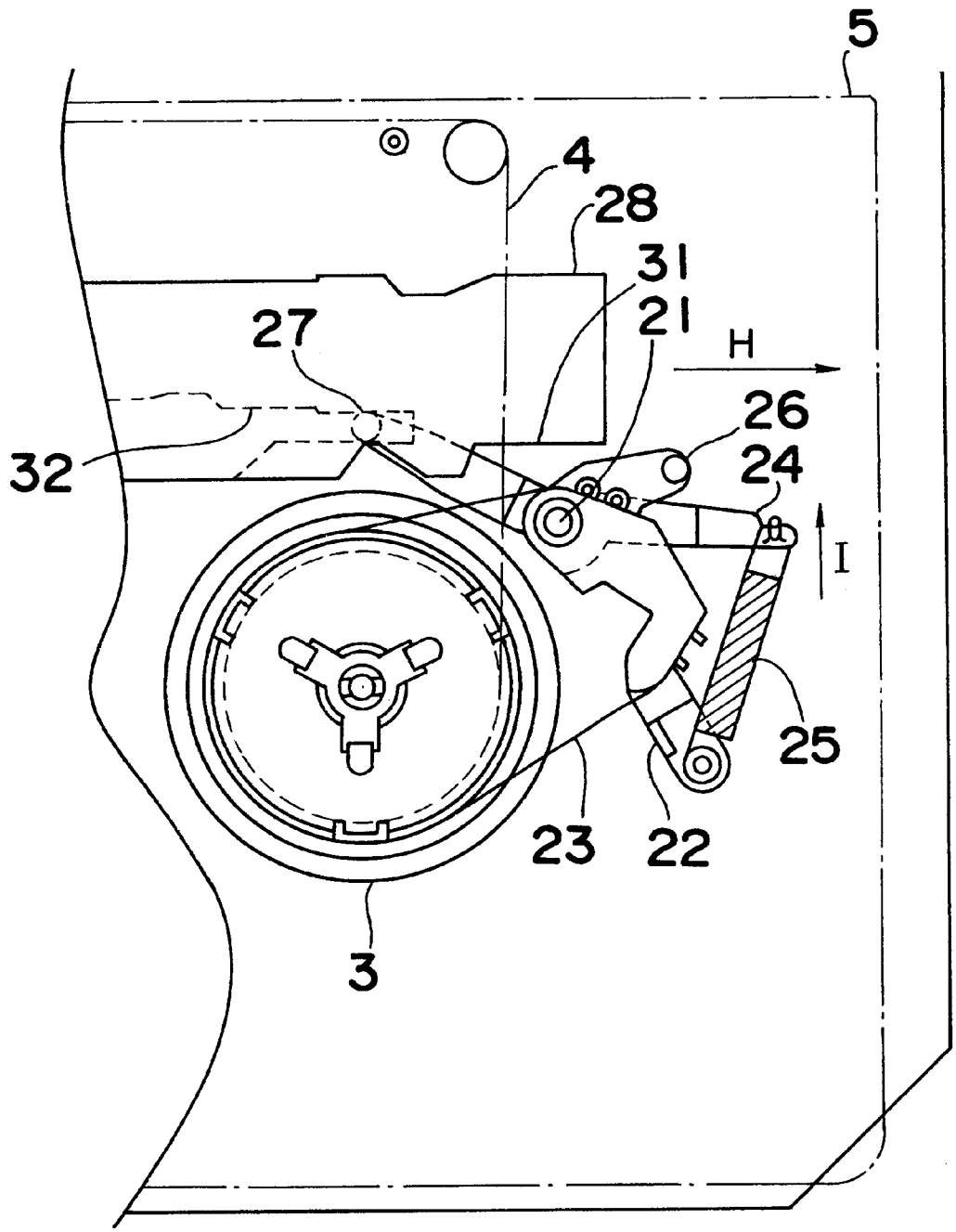
FIG. 3 is a top plan view showing a take-up reel base braking mechanism of the reel base braking mechanism of FIG. 1 at the time of loading of a tape cassette.
Figure 4:
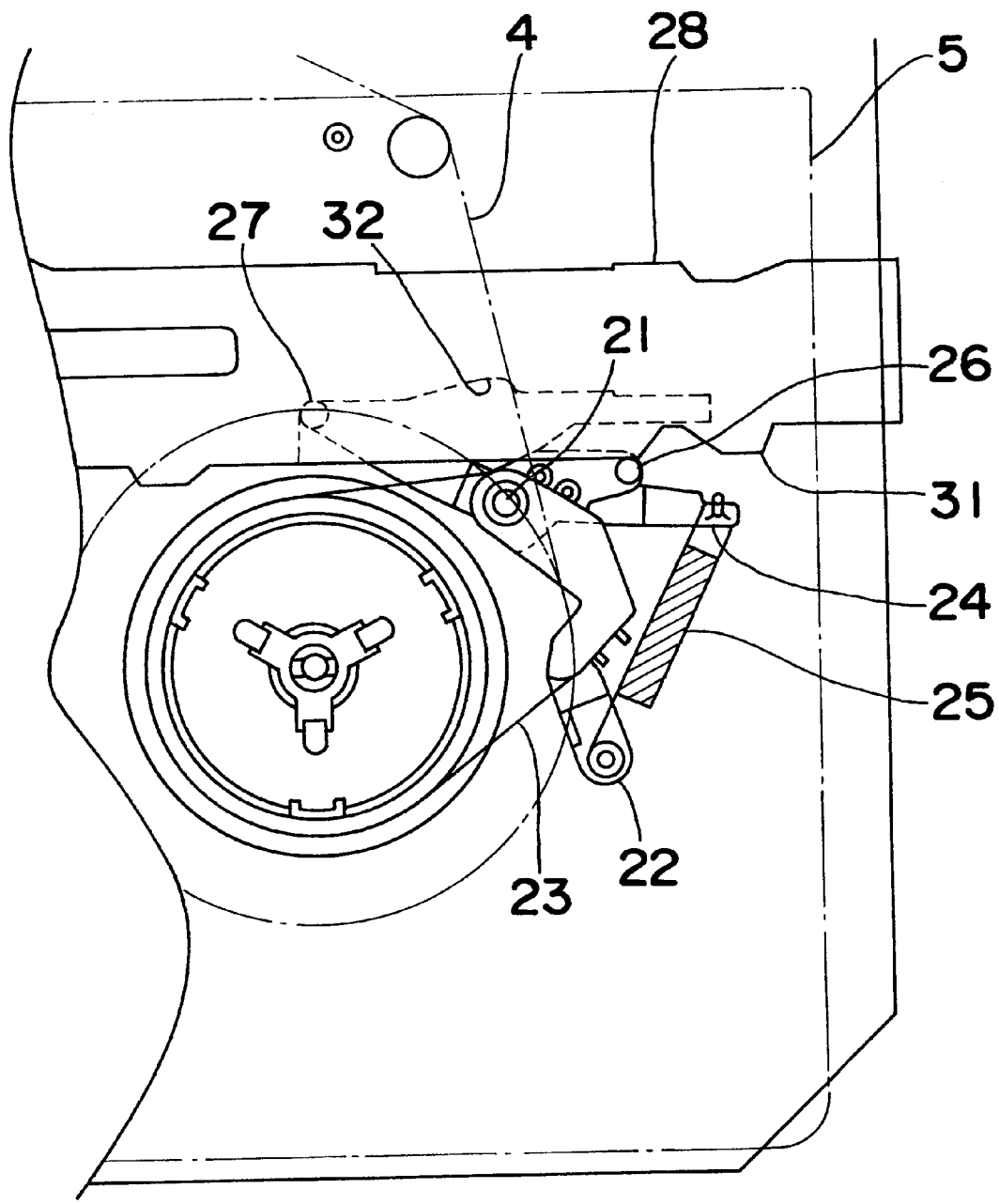
FIG. 4 is a top plan view showing the take-up reel base braking mechanism of FIG. 3 at the time of fast feed or rewinding of a magnetic tape.
Figure 5:
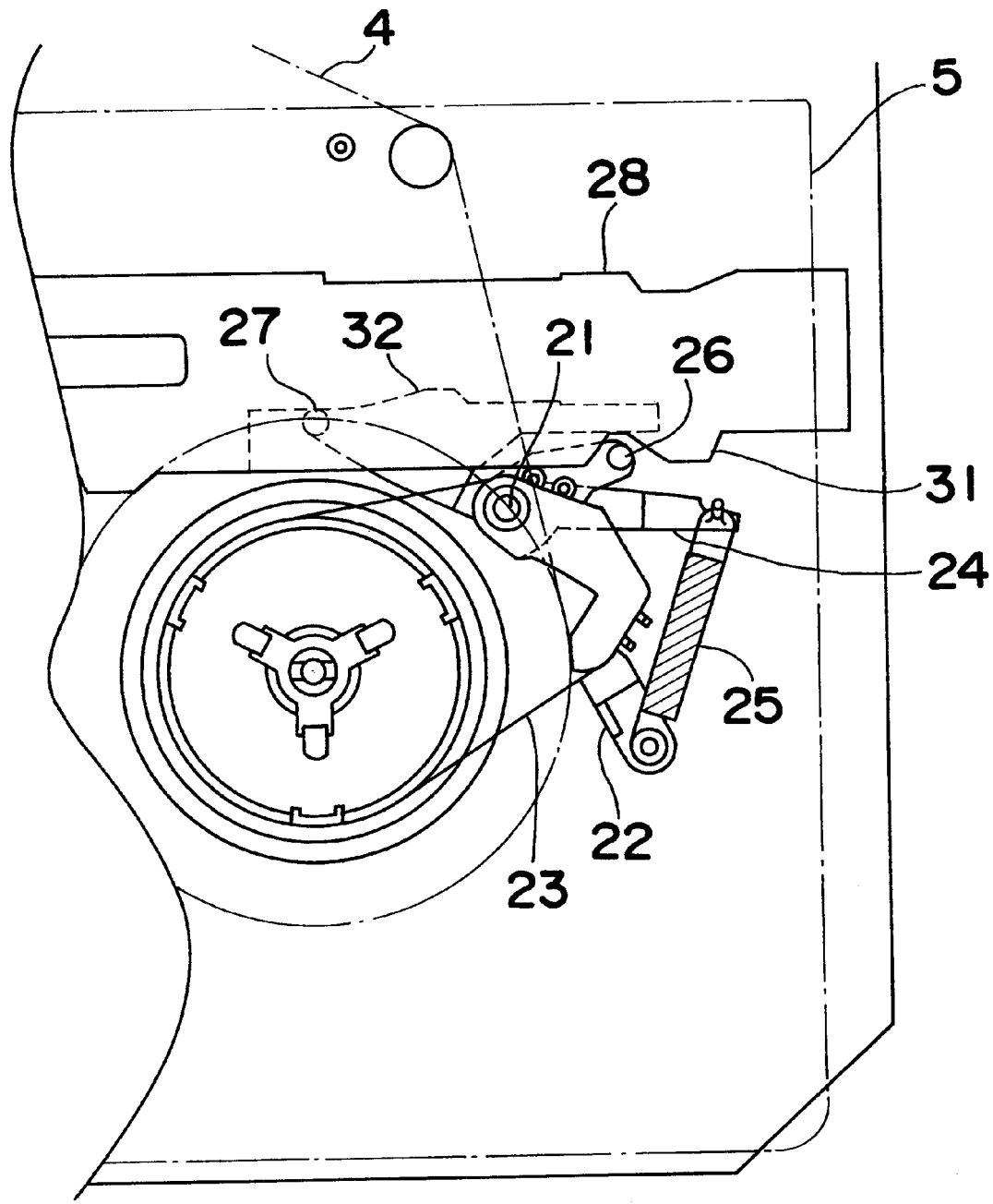
FIG. 5 is a top plan view of the take-up reel base braking mechanism of FIG. 3 in a tape stop state from fast feed or rewinding of the magnetic tape.

Referring now to the drawings, FIG. 1 shows a reel base braking mechanism of a magnetic recording and reproducing system according to one embodiment of the present invention, FIG. 2 shows a supply reel base braking mechanism of the reel base braking mechanism at the time of start of tape loading, FIG. 3 shows a take-up reel base braking mechanism of the reel base braking mechanism at the time of loading of a tape cassette, FIG. 4 shows the take-up reel base braking mechanism at the time of fast feed or rewinding of a magnetic tape and FIG. 5 shows the take-up reel base braking mechanism in a tape stop state from fast feed or rewinding of the magnetic tape.

Initially, arrangement and functions of the reel base braking mechanism are described. In FIG. 1, a capstan 1 is provided for rotationally driving a supply reel base 2 and a take-up reel base 3. Opposite ends of a magnetic tape 4 acting as a magnetic recording medium are wound around two reels of a tape cassette 5, respectively. When the tape cassette 5 has been loaded into a VTR, the magnetic tape 4 is drawn out of the tape cassette 5 by a mechanism (not shown) so as to be wound around a cylinder 6. The magnetic tape 4 is gripped between a capstan shaft 7 and a pinch roller 8 at the time of reproduction or reverse reproduction. Meanwhile, at the time of rewinding or fast feed of the magnetic tape 4, the magnetic tape 4 is fed in a state where the pinch roller 8 is spaced away from the capstan shaft 7. The magnetic tape 4 is gripped between the capstan shaft 7 driven rotationally and the pinch roller 8 so as to be fed. At this time, in order to bring the magnetic tape 4, at proper pressure, into contact with a magnetic head mounted on the cylinder 6, it is necessary to apply proper back tension to the magnetic tape 4 by the supply reel base 2. Meanwhile, when the magnetic tape 4 from fast feed or rewinding of the magnetic tape 4 is stopped from a operation, tape 4 should be stopped without producing slack of the magnetic or being subjected to excessive tension. Especially, at the supply reel base 2, it is necessary to apply substantially uniform tension to the magnetic tape 4 from the start of winding of the magnetic tape 4 to the end of winding of the magnetic tape 4, i.e., whole of the magnetic tape 4 at the time of recording and reproduction. This tension regulating function of the magnetic recording and reproducing system is similar to that of prior art and therefore, its description is abbreviated for the sake of brevity.

The arrangement of the supply reel base braking mechanism is described in detail with reference to FIGS. 1 and 2. A tension arm 9 is pivotally mounted on a pin 11 press fitted into a chassis 10 acting as a main body so as to be pivoted about the pin 11. A tension post 12 is fixed to one end portion of the tension arm 9 so as to be brought into sliding contact with the running magnetic tape 4 in accordance with the pivotal position of the tension arm 9. Meanwhile, one end of a tension coiled spring 13, acting as an urging member, or biasing is retained by the other end portion of the tension arm 9. Therefore, because the tension coiled spring 13 exerts a restoring force, pivotal couple is applied to the tension arm 9 by the tension coiled spring 13 in the direction of the arrow A in FIG. 2. A tension band 14, acting as a braking member of the supply reel base 2, is wound around a winding portion of the supply reel base 2. One end of the tension band 14 is attached to the tension arm 9 so as to be retained by a first retainer 15, while the other end of the tension band 14 is attached to the tension arm 9 so as to be retained by a second retainer 16. Meanwhile, the other end of the tension coiled spring 13 is brought into engagement with an elastic force adjusting member 17 acting as a control member. The elastic force adjusting member 17 is pivotally mounted on the chassis 10 so as to adjust the restoring force of the tension coiled spring 13. A follower 18 is formed integrally with the elastic force adjusting member 17. Through engagement between a guide portion 20 provided on a drive plate 19 and the follower 18, the elastic force adjusting member 17 is adapted to be pivoted in the direction of the arrow B or C in FIG. 1 in accordance with the travel distance of the drive plate 19.

The arrangement of the take-up reel base braking mechanism is described with reference to FIGS. 1 and 3 to 5. A braking means for braking the take-up reel base 3 is described with reference to FIGS. 1 and 3. A first arm 22 is pivotally mounted on a support shaft 21 secured to the chassis 10 so as to be pivoted about the support shaft 21. A brake band 23 is wound around the take-up reel base 3 through a predetermined angle and opposite ends of the brake band 23 are attached to the first arm 22. A second arm 24 is pivotally mounted on the support shaft 21 coaxially with the first arm 22 so as to be pivoted about the support shaft 21. One end of a tension coiled spring 25 acting as an elastic member is attached to the first arm 22, while the other end of the tension coiled spring 25 is attached to the second arm 24 such that the amount of expansion and contraction of the tension coiled spring 25 changes according to a pivotal positional relation between the first arm 22 and the second arm 24. A first follower 26 for regulating the pivotal position of the first arm 22 is formed integrally with the first arm 22, while a second follower 27 for regulating the pivotal position of the second arm 24 is formed integrally with the second arm 24. A main lever 28, acting as an operational mode switching means, is movably mounted on the chassis 10 so as to regulate the first and second followers 26 and 27.

Operation of the reel base braking mechanism of the magnetic recording and reproducing system, which has the above described arrangement, is described with reference to the drawings. Initially, operation of the supply reel base braking mechanism is described with reference to FIGS. 1 and 2. At the time of loading of the tape cassette 5 and during loading operation of the magnetic tape 4 after loading of the tape cassette 5, namely, at the pivotal position occupied by the tension arm 9 after drawing of the tension arm 9 by a drawing means (not shown) and prior to contact of the tension arm 9 with the magnetic tape 4, the drive plate 19 is driven in the direction of the arrow E in FIG. 2 by a drive means (not shown). The follower 18, provided integrally with the elastic force adjusting member 17, is spaced away from the guide portion 20 of the drive plate 19 by the shape of the guide portion 20 so as to be pivoted up to a position regulated by the restoring force of the tension coiled spring 13 and thus, is urged by the tension coiled spring 13 to pivot in the direction of the arrow F in FIG. 2. A push portion 29, provided integrally with the elastic force adjusting member 17, is regulated at a first position where the push portion 29 is held in contact with a cam face 30 of the second retainer 16, which acts as a guide portion. The tension arm 9 is pivoted in the direction of the arrow A in FIG. 2 by the restoring force of the tension coiled spring 13 so as to be urged towards a state of completion of loading of the magnetic tape 4. At this time, since the push portion 29 depresses the cam face 30 of the second retainer 16, the second retainer 16 is pivoted in the direction of the arrow G in FIG. 2 so as to eliminate slack of the tension band 14. Therefore, it becomes possible to apply a predetermined tension to the tension band 14 at all times while pivotal force in the direction of the arrow A is being imparted to the tension arm 9. Hence, even if the tension post 12 is held out of contact with the magnetic tape 4 at the time of loading of the tape cassette 5 and during loading of the magnetic tape 4, a braking force is applied to the supply reel base 2. Engagement between the push portion 29 of the elastic force adjusting member 17 and the cam face 30 of the second retainer 16 is set properly for change of operating length of the tension coiled spring 13 such that proper braking force is applied to the supply reel base 2.

Hereinafter, operation of the take-up reel base braking mechanism is described with reference to FIGS. 1 and 3–5. Initially, since a brake for preventing slack of the magnetic tape 4, which is provided in the tape cassette 5, is released suddenly at the time of completion of loading of the tape cassette 5, the released magnetic tape 4 may deviate out of the tape cassette 5 so as to be slackened greatly and drop from a height regulating member. This can result in damage to the magnetic tape 4 during subsequent loading of the magnetic tape 4. In order to obviate such a risk, the main lever 28 is kept substantially stationary at a position shown in FIG. 3 at the time of loading of the tape cassette 5. As a result, the first follower 26 of the first arm 22 is spaced away from a first cam face 31 of the main lever 28 and thus, the first arm 22 is released from pivotal regulation. Meanwhile, the second arm 24 is displaced through engagement of the second follower 27 of the second arm 24 with a second cam face 32 of the main lever 28 so as to be pivoted through a predetermined angle in the direction of the arrow I in FIG. 3. Therefore, the tension coiled spring 25, stretched between the first and second arms 22 and 24, is expanded or contracted up to a position corresponding to the pivotal amount of the second arm 24. At this time, the first arm 22 is pivoted counterclockwise by a reaction force corresponding to the amount of expansion and contraction of the tension coiled spring 25 and is subjected to a reaction force of the tension coiled spring 25 at a position where no slack of the brake band 23 exists. As a result, counterclockwise moment is applied to the first arm 22. In this case, tension corresponding to moment of the first arm 22 is applied to the brake band 23 wound around the take-up reel base 3, so that frictional force is applied between the take-up reel base 3 and the brake band 23 so as to impart braking force to the take-up reel base 3 such that the magnetic tape 4 is not slackened at the time of completion of loading of the tape cassette 5.

Subsequently, when loading of the magnetic tape 4 is performed after completion of loading of the tape cassette 5, the main lever 28 is displaced in the direction of the arrow H in FIG. 3 by a drive means (not shown), so that the magnetic tape 4 is drawn by a tape drawing member so as to be wound around the cylinder 6. Drawing of the magnetic tape 4 is continued until the magnetic tape 4 is positioned so as to enable stable running for reproduction and recording. At this time, braking force is applied to the take-up reel base 3 through operative association between the second cam face 32 of the main lever 28 and the second follower 27 of the second arm 24 and thus, predetermined tension can be applied to the drawn magnetic tape 4. As a result, slack of the magnetic tape 4 due to drop of the magnetic tape 4 from a regulatory lead surface at the time of contact of the magnetic tape 4 with the cylinder 6, due to drop of the tape drawing member from the height regulating member caused by change of drawing speed of the magnetic tape 4 or due to excessive feed of the magnetic tape 4 caused by inertia of the take-up reel base 3 is prevented.

Then, a case in which the magnetic tape 4 is stopped from fast feed mode or rewinding mode at high speed is described with reference to FIGS. 4 and 5. Initially, at the time of rewinding mode at high speed, the take-up reel base 3 is a driven side and braking force is not applied to the driven reel base 3 usually in order to minimize winding load. Thus, the main lever 28 is displaced to a position shown in FIG. 4 in which the first cam face 31 displaces the first follower 26 of the first arm 22 and the first arm 22 is pivoted clockwise regardless of the reaction force of the tension coiled spring 25 such that the position of the first arm 22 is regulated by the main lever 28. Therefore, since slack is produced in the brake band 23 but there is no tension in the brake band 23, no braking force is applied to the take-up reel base 3. Thus, during fast feed or rewinding of the magnetic tape 4 at high speed, braking force is cancelled so as to reduce winding load of the magnetic tape 4.

Then, stop operation of the magnetic tape 4 from fast feed mode or rewinding mode is described. Substantially concurrently with stop of winding of the magnetic tape 4, the main lever 28 is displaced from the position shown in FIG. 4 to the position shown in FIG. 5 by the drive means (not shown). As a result, the first follower 26 of the first arm 22 and the first cam face 31 of the main lever 28 are spaced away from each other, so that the first arm 22 is pivotally provided such that pivotal moment corresponding to reaction force of the tension coiled spring 25 is applied to the first arm 22. The second follower 27 of the second arm 24 is lifted by the second cam face 32 of the main lever 28 so as to pivot the second arm 24 counterclockwise through a predetermined angle such that tension enabling braking the take-up reel base 3 rotating at high speed at the time of fast feed or rewinding of the magnetic tape at high speed is applied from the brake band 23 to the take-up reel base 3. As a result, a large reaction force corresponding to the amount of expansion and contraction of the tension coiled spring 25 is obtained by the tension coiled spring 25 and thus, braking force for stopping the take-up reel base 3, rotating at high speed, is applied to the take-up reel base 3.

In the reel base braking mechanism of the above described arrangement, stable optimum braking force can be applied to the supply reel base 2 and the take-up reel base 3 during loading of the magnetic tape 4 from loading of the magnetic cassette 5 to completion of loading of the magnetic tape 4 without the need for adding a brake member for exclusive use. Therefore, it becomes possible to prevent slack of the magnetic tape 4 at the time of loading of the tape cassette 5 or slack of the magnetic tape 4 due to drop of the magnetic tape 4 from the regulatory lead surface during loading of the magnetic tape 4, due to drop of the tape drawing member from the height regulating member caused by change of drawing speed of the magnetic tape 4 during loading of the magnetic tape 4 or due to excessive feed of the magnetic tape 4 caused by inertia of the take-up reel base 3 around completion of loading of the magnetic tape 4. Especially, during loading of the magnetic tape 4, by optimizing the push portion 29 of the first retainer 15 in the supply reel base braking mechanism and the first and second cam faces 31 and 32 of the main lever 28 in the take-up reel base braking mechanism, optimum back tension corresponding to change of drawing speed of the magnetic tape 4 can be applied to the magnetic tape as required and thus, damage to the magnetic tape 4 can be prevented in advance.

Meanwhile, during delivery rotation, i.e., rewinding rotation of the magnetic tape 4 of the take-up reel base 3 in the take-up reel base braking mechanism, a minimum distance from a line of action of tension of the brake band 23 to the support shaft 21 of the first arm 22 at a high-tension side of the brake band 23 is set as a first minimum distance, while a minimum distance from a line of action of tension of the brake band 23 to the support shaft 21 of the first arm 22 at a low-tension side of the brake band 23 is set as a second minimum distance. When the brake band 23 is held at such a position of the first arm 22 that the first minimum distance is set smaller than the second minimum distance, the braking force of the take-up reel base 3 during rewinding rotation of the magnetic tape 4 can be made larger than the braking force of the take-up reel base 3 during winding rotation of the magnetic tape 4, so that functions identical with those of prior art reel base braking mechanisms can be obtained.

Therefore, in the supply reel base braking mechanism and the take-up reel base braking mechanism of the present invention, exclusive brake members for applying braking force to the reel bases at the time of loading of the tape cassette 5 and during loading of the magnetic tape 4 and further exclusive brake members for slopping the magnetic tape 4 from fast feed or rewinding of the magnetic tape 4 at high speed, which have been hitherto required to be provided for conventional braking mechanisms of this kind, are made unnecessary, so that the number of their components and the number of their assembly steps are reduced substantially, thereby resulting in a significant reduction of their production cost.

Meanwhile, since the band brake having a large winding angle is employed, stable braking load having less fluctuations can be obtained as compared with conventional block brakes and thus, damage to the magnetic tape 4 can be prevented preliminarily. Meanwhile, advantages such as long service life based on reduction of face pressure and improvement of reliability can also be realized.

Figure 6:
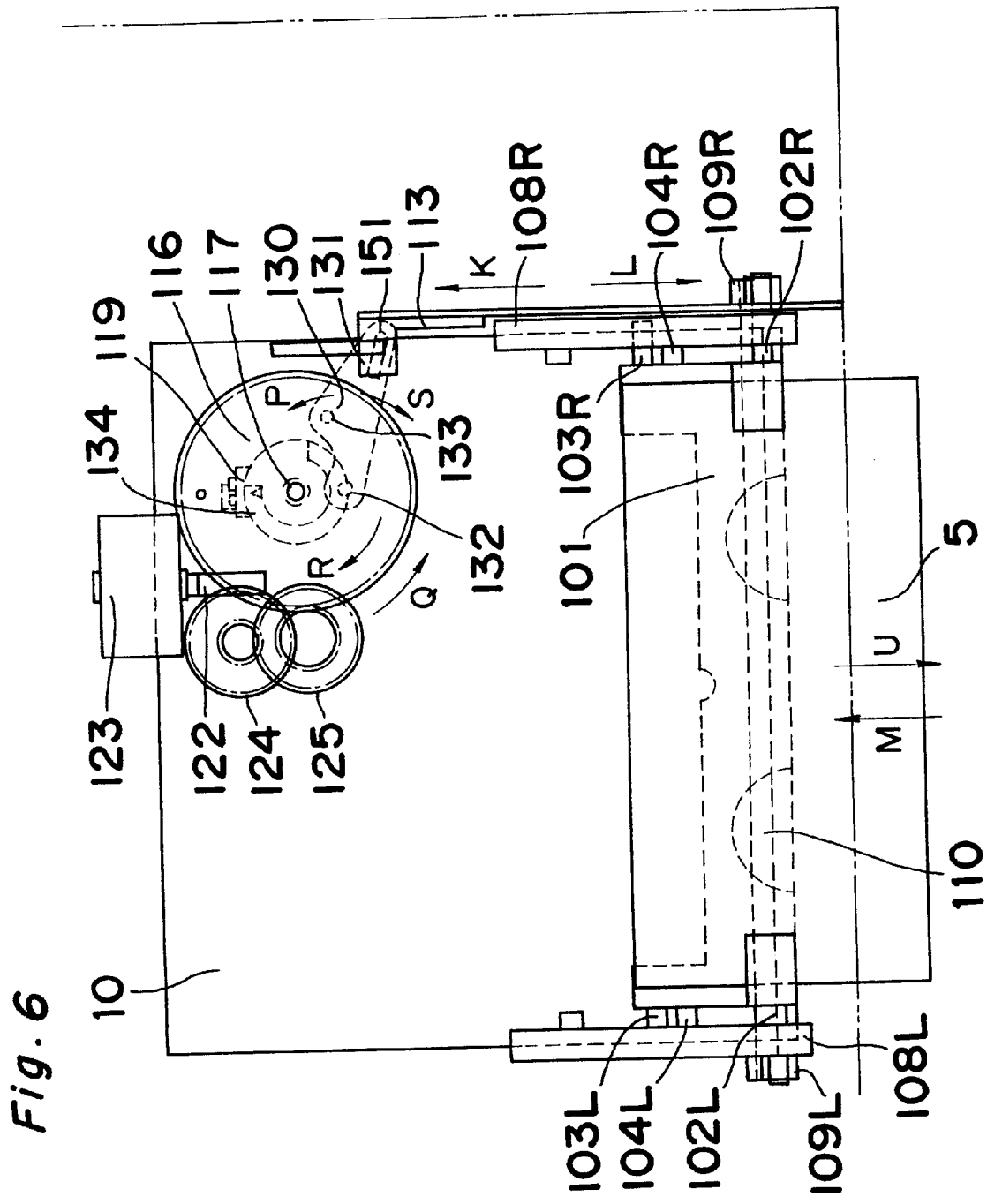
FIG. 6 is a top plan view of a tape cassette loading apparatus and its drive portion of the magnetic recording and reproducing system of FIG. 1.
Figure 7:
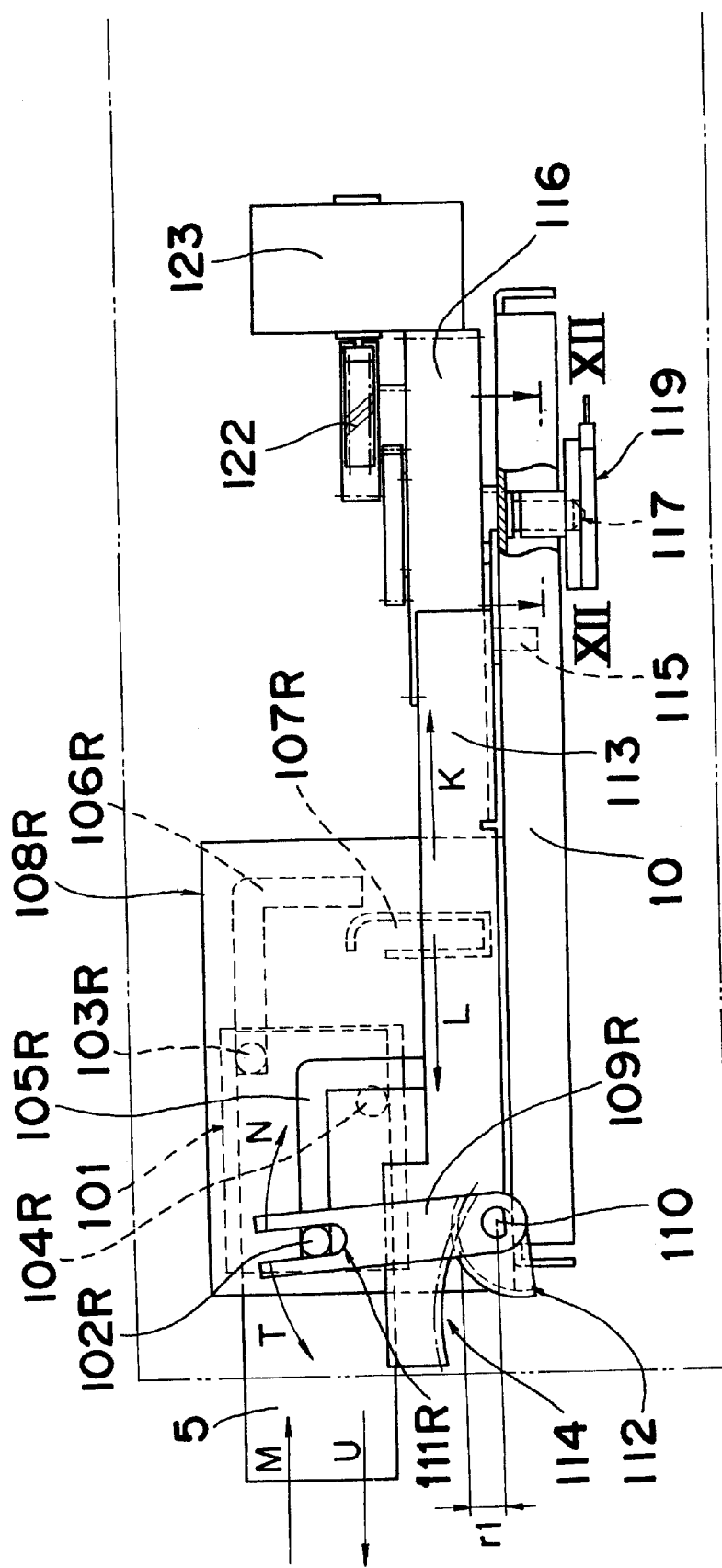
FIG. 7 is a side elevational view showing the tape cassette loading apparatus of FIG. 6 in a state of ejection of the tape cassette.
Figure 8:
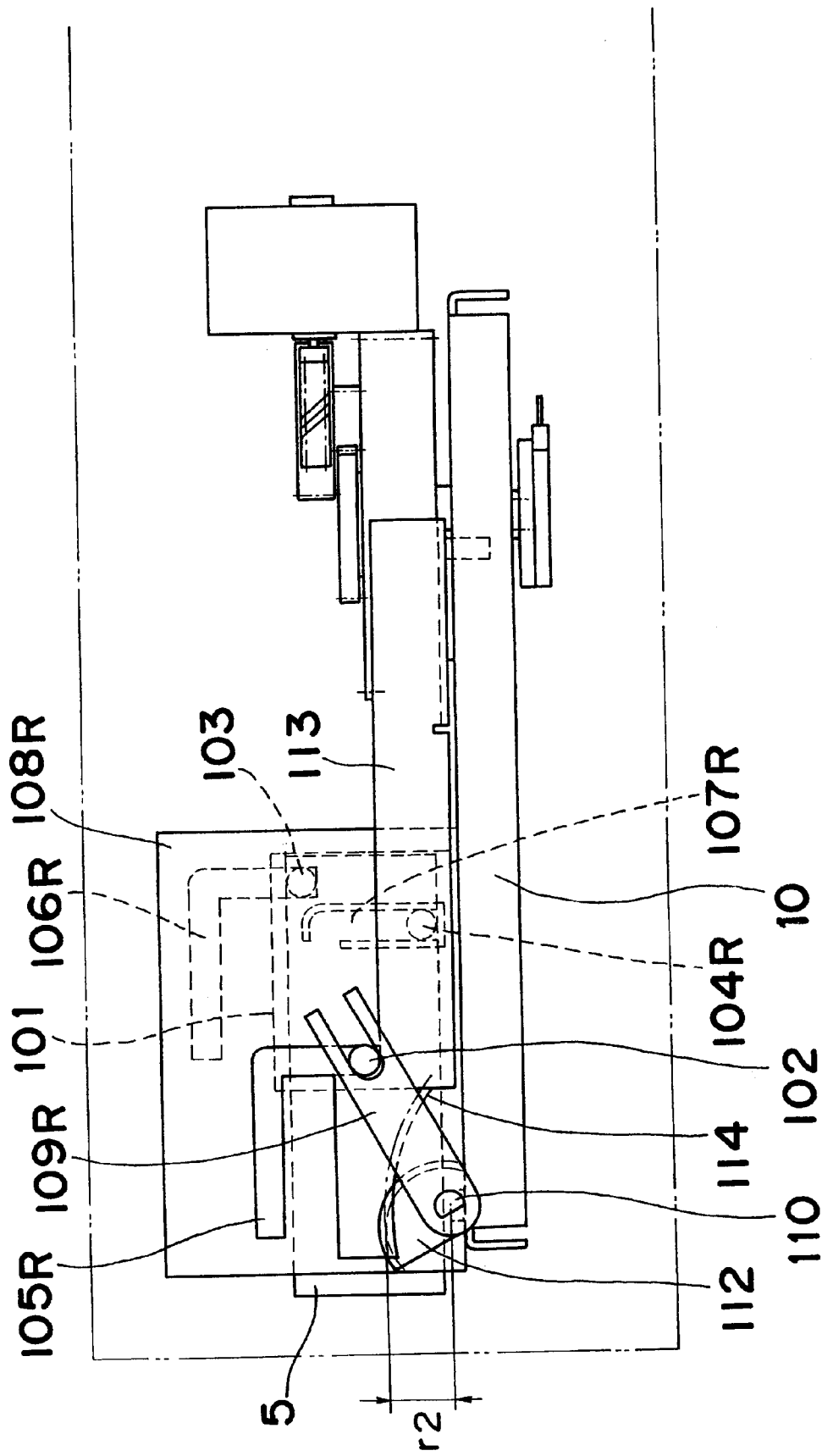
FIG. 8 is a side elevational view showing the tape cassette loading apparatus of FIG. 6 in a state of descent of the tape cassette.
Figure 12:
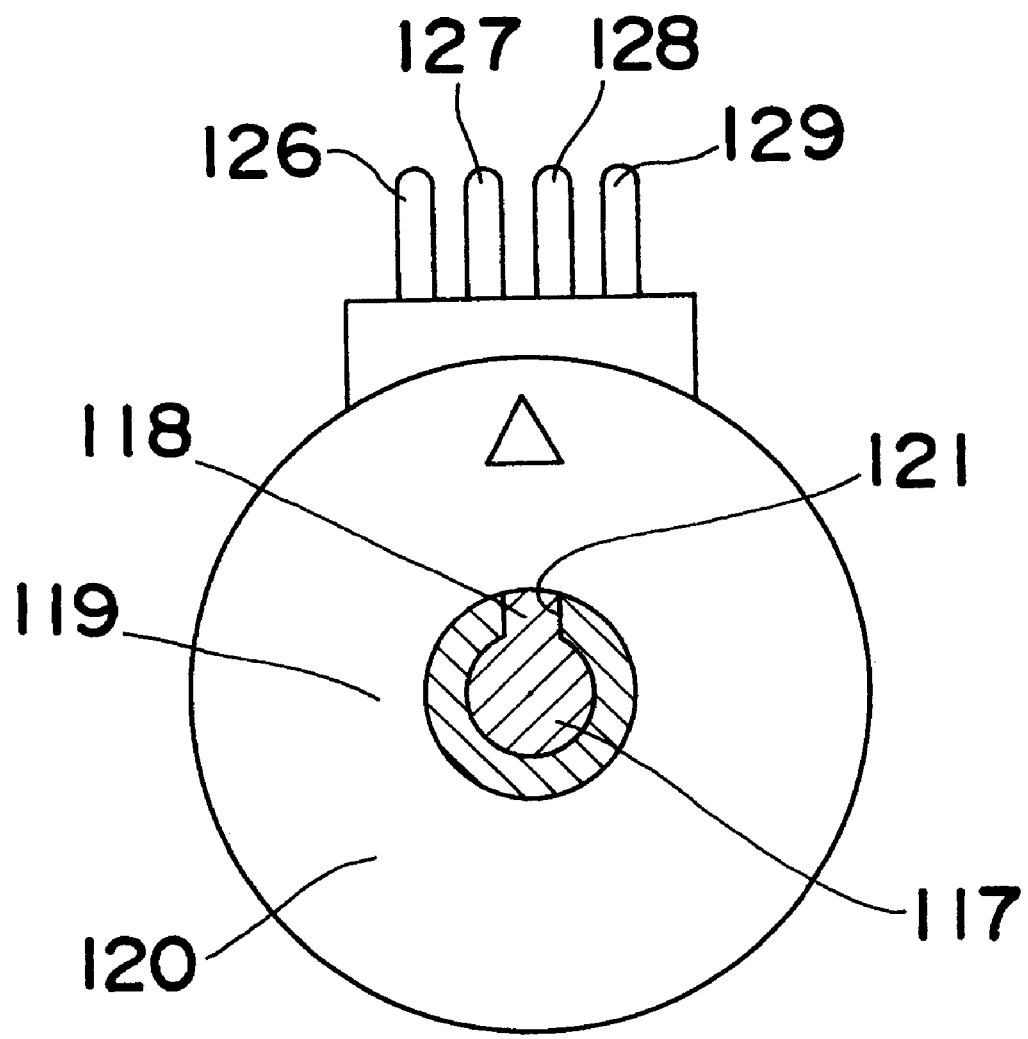
FIG. 12 is a sectional view taken along the line XII—XII in FIG. 7 and showing a mode switch in detail.
Figure 15:
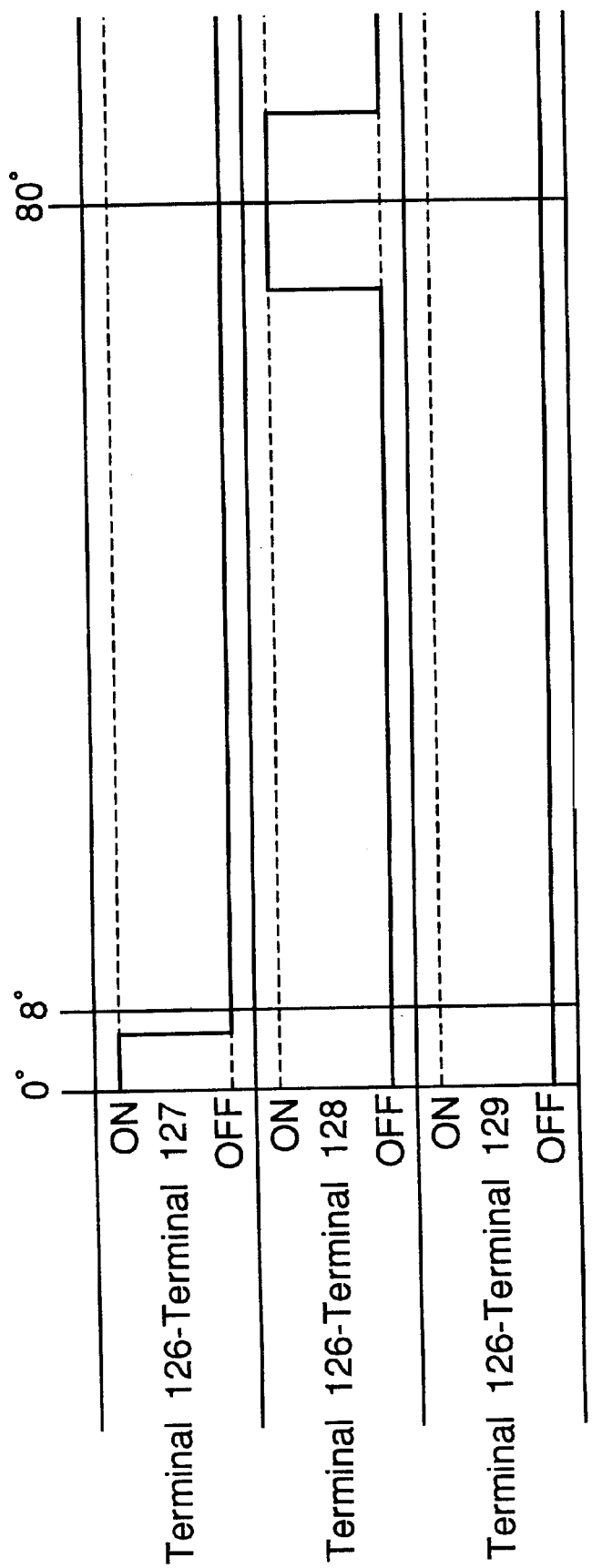
FIG. 15 is a timing chart of the mode switch of FIG. 12.

Then, arrangement and operation of a tape cassette loading apparatus of the magnetic recording and reproducing system are described. Initially, an arrangement of the tape cassette loading apparatus is described with reference to FIGS. 6–8, 12 and 15. FIGS. 6 and 7 show a state in which the tape cassette 5 can be detached from and mounted on the magnetic recording and reproducing system, (hereinafter, referred to as an "ejected state" of the tape cassette 5). Meanwhile, FIG. 8 shows a state in which signals can be recorded on or reproduced from the magnetic tape 4 incorporated in the tape cassette 5 which is depressed to and fixed at a predetermined position in the magnetic recording and reproducing system, (hereinafter, referred to a "cassette-down state"). FIG. 12 shows a mode switch 119 for detecting operational modes of the magnetic recording and reproducing system, while FIG. 15 is a timing chart of the mode switch 119.

A cassette holder 101 for holding the tape cassette 5 incorporating the magnetic tape 4 includes opposite guide pins 102R, 103R and 104R and 102L, 103L and 104L. Opposite side plates 108R and 108L are secured to the chassis 10. The side plate 108R has guide grooves 105R, 106R and 107R which are, respectively, brought into engagement with the guide pins 102R, 103R and 104R so as to control movement of the cassette holder 101 and attitude of the cassette holder 101 during movement of the cassette holder 101. Likewise, the side plate 108L has three guide grooves (not shown) for receiving the guide pins 102L, 103L and 104L, respectively. Wiper arms 109R and 109L each acting as a drive arm are fixed to a synchronous shaft 110 at an identical phase and are pivotally mounted in openings formed by the side plates 108R and 108L and the chassis 10 so as to be pivoted about the synchronous shaft 110. A slot 111R formed on the wiper arm 109R is brought into engagement with the guide pin 102R. Although riot specifically shown, the wiper arm 109L also has the same arrangement as the wiper arm 109R. An eccentric gear 112 having a center which deviates from the pivotal center of the wiper arm 109R is formed integrally with the wiper arm 109R. A drive rack 113, acting as a straight motion means, is movably mounted on the side plate 108R so as to be moved in the directions of the arrows K and L in FIG. 7. An internal gear 114 in mesh with the eccentric gear 112 is formed at one end portion of the drive rack 113, while an engagement pin 115 is attached to the other end portion of the drive rack 113 and is brought into engagement with an elongated opening 131 of a drive arm 130 which is rotationally driven by a main cam gear 116. As shown in FIG. 12, a rotary shaft 117 of the main cam gear 116 has a key portion 118 so as to be passed through a hole of the chassis 10 and the key portion 118 is fitted into a key slot 121 formed integrally on a rotor 120 of the mode switch 119 such that a rotational angle of the main cam gear 116 can be detected. FIG. 15 is a timing chart showing the relation the rotational between angle of the main cam gear 116 and an electrically conductive state of each terminal. A worm gear 122 having a displacement angle of 30° is mounted on an output shaft of a DC motor 123 acting as a rotational drive means so as to be disposed above the main cam gear 116. A first speed reduction gear 124 and a second speed reduction gear 125 are mounted so as to transmit driving force from the worm gear 122 to the main cam gear 116.

Figure 9:
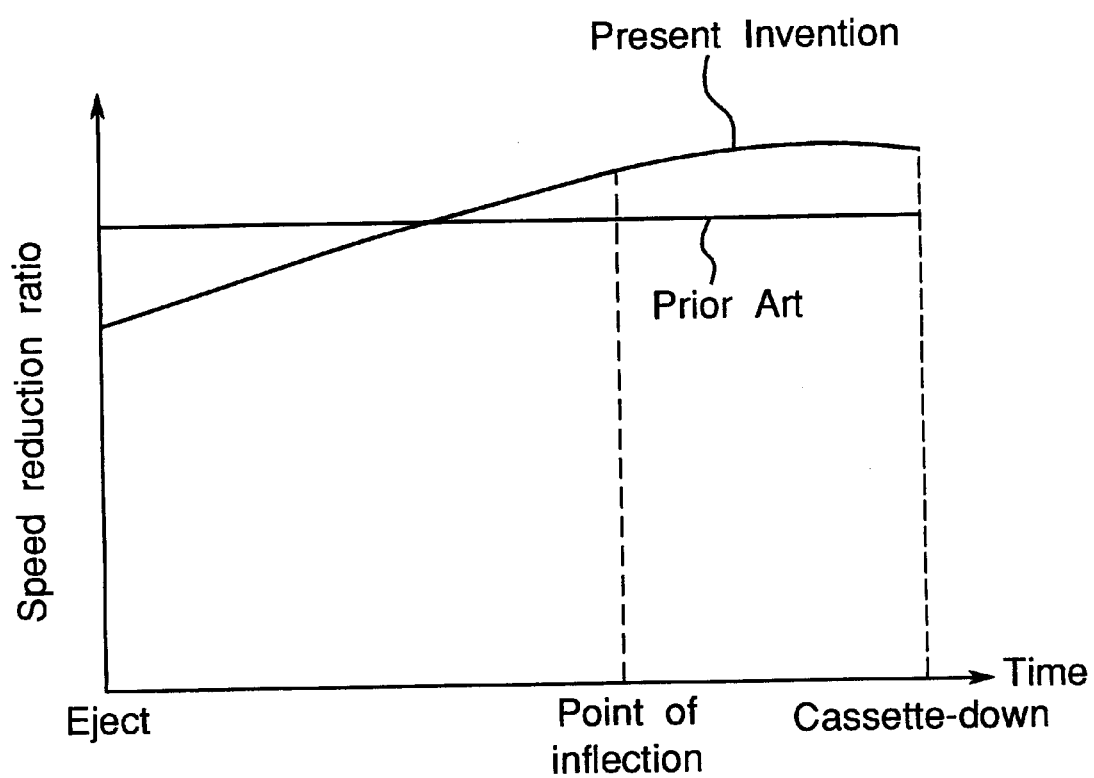
FIG. 9 is a graph showing changes of speed reduction ratio from a main cam gear to a wiper arm in the magnetic recording and reproducing system of FIG. 1.

By the above described arrangement of the tape cassette loading apparatus, when the tape cassette 5 is moved from the ejected state to the cassette-down state as shown in FIGS. 7 and 8, the distance between a mesh position of mesh between the drive rack 113 and the eccentric gear 112 and the pivotal center of the wiper arms 109R and 109L, i.e., center of the synchronous shaft 110 increases from r1 to r2, so that the speed reduction ratio from the DC motor 123 to the wiper arms 109R and 109L changes gradually. FIG. 9 shows the change of speed reduction ratio from the main cam gear 116 to the wiper arm 109R when the tape cassette 5 is moved from the ejected state to the cassette-down state.

Figure 13:
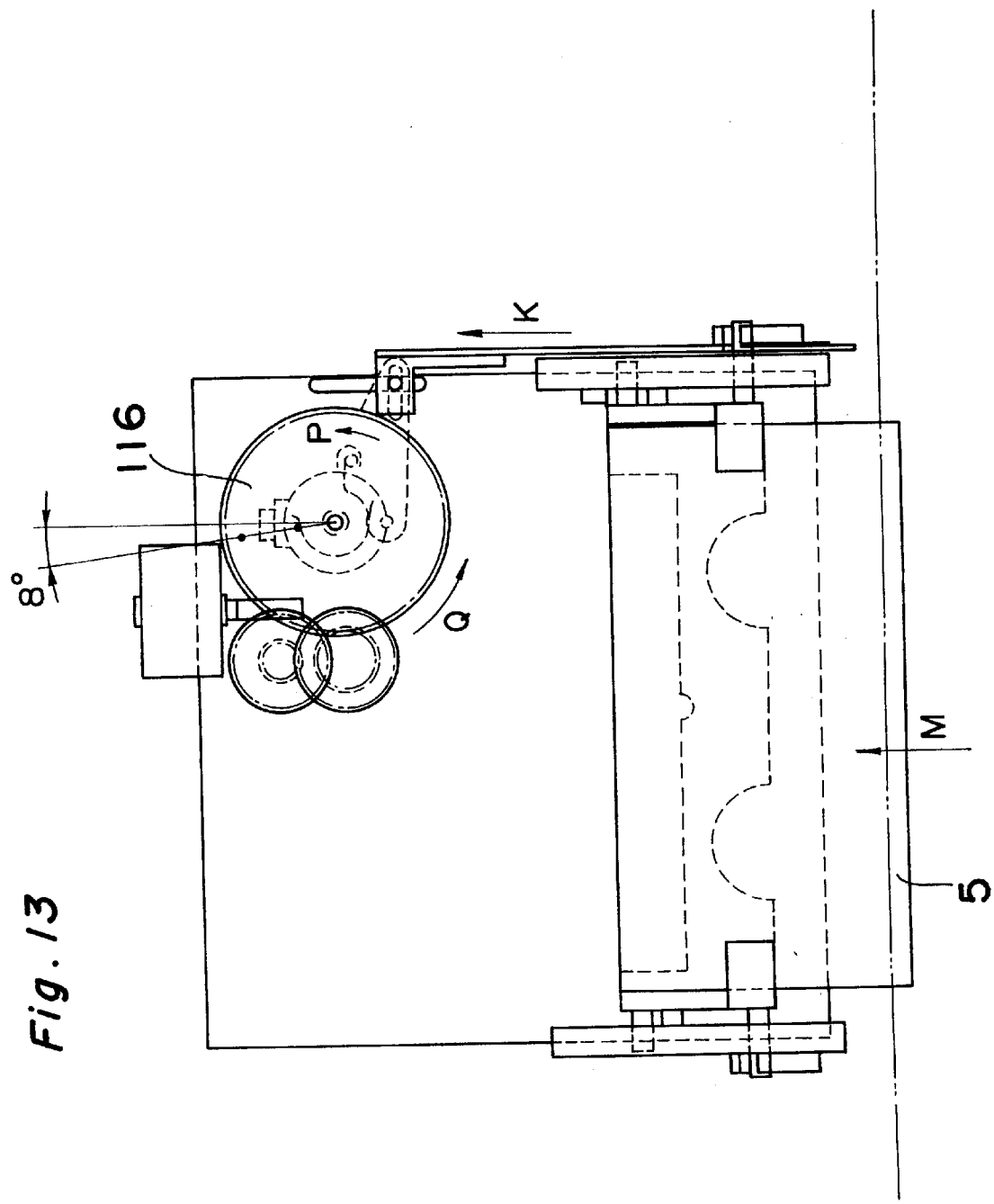
FIG. 13 is a top plan view showing a state in which the tape cassette has been pushed into the magnetic recording and reproducing system of FIG. 1.

Hereinafter, operation of the tape cassette loading apparatus of the above described arrangement in the magnetic recording and reproducing system is described. Initially, a cassette loading operation for mounting the tape cassette 5 at a predetermined position of the magnetic recording and reproducing system is described. FIGS. 6 and 7 show the ejected state in which the tape cassette 5 is mounted at a predetermined position of the cassette holder 101 from exterior of the magnetic recording and reproducing system so as to partially project out of the magnetic and recording system. At this time, the mode switch 119 having terminals 126–129 assumes a state of 0° in FIG. 15, in which only the terminals 126 and 127 are electrically conducted to each other and an operational mode of the magnetic recording and reproducing system is detected as the ejected state. If the tape cassette 5 is depressed from this state in the direction of the arrow M in FIGS. 6 and 7 with at least a predetermined force, the wiper arms 109R and 109L are pivoted in the direction of the arrow N in FIG. 7 through the guide pins of the cassette holder 101, so that the eccentric gear 112 of the wiper arm 109R is also rotated likewise and thus, the drive rack 113 is moved in the direction of the arrow K in FIGS. 6 and 7. As a result, the drive arm 130 is pivoted about a pivotal shaft 132 in the direction of the arrow P in FIG. 6 by the engagement pin 115 of the drive rack 113 and a cam follower 133 depresses or engages walls of a cam groove 134 of the main cam gear 116 so as to rotate the main cam gear 116 in the direction of the arrow Q in FIG. 6. This rotational torque is transmitted to the second speed reduction gear 125 and the first speed reduction gear 124 and surpasses idling torque of the DC motor 123 so as to reversely rotate the worm gear 122 and thus, the DC motor 123 is rotated. Therefore, the force necessary for depressing the tape cassette 5 can be determined based on loss of torque in a power transmission system, coefficients of friction and speed reduction ratio. Thereafter, a state in which the main cam gear 116 is rotated through 8° from the state of FIG. 6 in the direction of the arrow Q as shown in FIG. 13 is reached and the rotor 120 of the mode switch 119 is also rotated through 8° in the same manner as the main cam gear 116. When electrical conduction between the terminals 126 and 127, between the terminals 126 and 128 and between the terminals 126 and 129 is eliminated wholly as will be seen from FIG. 15, the mode switch 119 detects that the tape cassette 5 has been depressed or inserted into the magnetic recording and reproducing system and rotates the DC motor 123 in a predetermined direction. This driving force rotationally drives the main cam gear 116 in the direction of the arrow Q, so that the drive arm 130 is pivoted about the pivotal shaft 132 in the direction of the arrow P in FIG. 6 via the gear trains through engagement of the cam follower 133 of the drive arm 130 with the cam groove 134 of the main cam gear 116 and thus, the drive rack 113 is displaced in the direction of the arrow K in FIGS. 6 and 7. Consequently, the wiper arms 109R and 109L are driven in the direction of the arrow N in FIG. 7, so that the tape cassette 5 is displaced in a predetermined attitude together with the cassette holder 101 along the guide grooves substantially in parallel with the chassis 10 initially, and then, substantially perpendicularly to the chassis 10.

Figure 14:
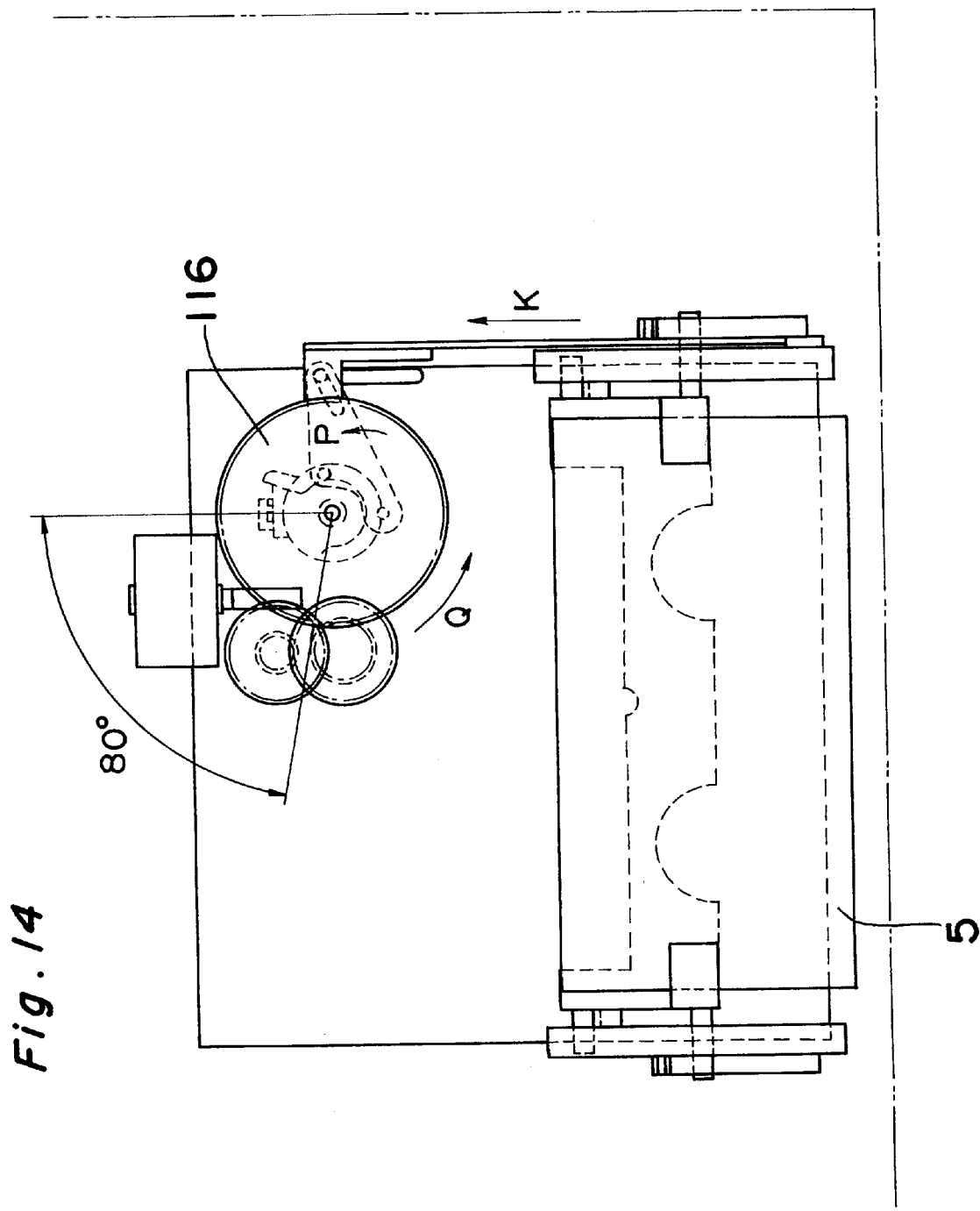
FIG. 14 is a top plan view showing a state in which the tape cassette has been lowered in the magnetic recording and reproducing system of FIG. 1.

Hereinafter, the above motion of the tape cassette 5 parallel to the chassis 10 is referred to as "horizontal motion", and the above motion of the tape cassette 5 perpendicular to the chassis 10 is referred to as "vertical motion", A changeover point from the horizontal motion to the vertical motion is referred to as a "point of inflection". At this time, in a state where the main cam gear 116 has been rotated through 80° from the ejected state of FIG. 6, the rotor 120 of the mode switch 119 is also rotated through 80° in the same manner as the main cam gear 116 as shown in FIG. 14, so that only the terminals 126 and 128 are electrically conducted to each other and thus, the operational mode can be detected as the cassette down state. As shown in FIG. 8, the tape cassette 5 is depressed to and fixed at the predetermined position of the chassis 10 through the cassette holder 101 by the wiper arms 109R and 109L. Subsequently, rotation of the main cam gear 116 is continued due to the shape of the cam groove 134 of the main cam gear 116. Thus, even if operations of mechanisms other than the tape cassette loading apparatus are controlled, the drive arm 130 is held in the state of FIG. 14, namely, the tape cassette 5 is held in the cassette-down state.

Then, operation for ejecting the tape cassette 5 is described. When an operation for ejecting the tape cassette 5 is started, the DC motor 123 is rotated in the direction opposite to that of operation for loading the tape cassette 5 and thus, the main cam gear 116 is rotated in the direction of the arrow R in FIG. 6. After the main cam gear 116 has been rotated through a predetermined angle in the direction of the arrow R, the drive arm 130 is pivoted in the direction of the arrow S in FIG. 6, so that the drive rack 113 is moved in the direction of the arrow L in FIGS. 6 and 7 and thus, the wiper arms 109R and 109L are pivoted in the direction of the arrow T in FIG. 7. As a result, the tape cassette 5 moves along with the cassette holder 101 in the vertical motion and in the horizontal motion by way of the point of inflection. In the course of such motions, by detecting the change from the state in which there is no electrical conduction among the terminals 126–129 of the mode switch 119 to the state in which only the terminals 126 and 127 are electrically conducted to each other, the DC motor 123 is stopped. However, the tape cassette 5 is not stopped instantaneously upon the stopping of the DC motor 123 due to the by inertia of the tape cassette loading apparatus and the DC motor 123. Therefore, the tape cassette 5 is further displaced in the direction of the arrow U in FIGS. 6 and 7 and then, is stopped upon contact of each of the guide pins with a terminal end of each of the guide grooves. In this state, the tape cassette 5 can be detached from and mounted on the magnetic recording and reproducing system.

Figure 10:
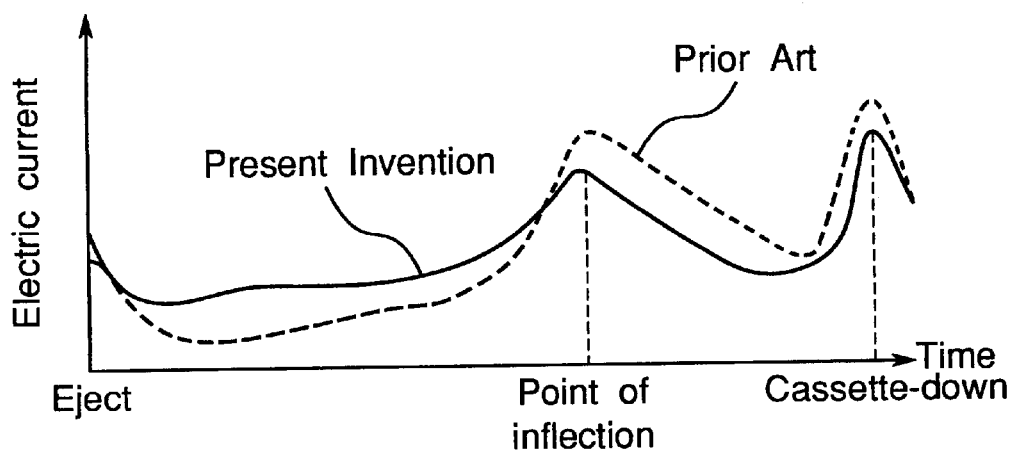
FIG. 10 is a graph showing changes of electric current of a loading motor of the magnetic recording and reproducing system of FIG. 1 at the time of loading of the tape cassette.
Figure 11:
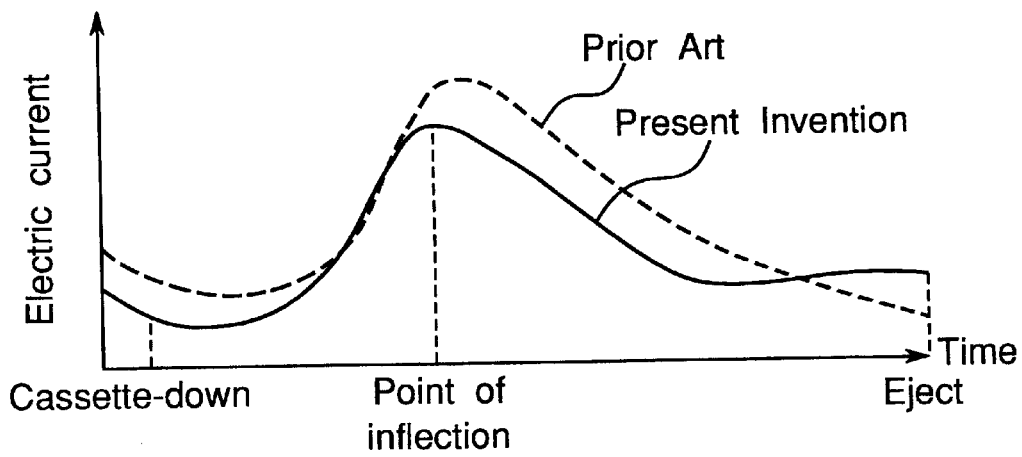
FIG. 11 is a graph showing changes of electric current of the loading motor of FIG. 10 at the time of ejection of the tape cassette.

FIG. 10 shows electric current of the DC motor 123 at the time of the operation for loading the tape cassette 5, while FIG. 11 shows electric current of the DC motor at the time of operation for ejecting the tape cassette 5. Since the DC motor 123 is driven at a constant voltage, driving load and electric current are proportional to each other. It is apparent from FIGS. 10 and 11 that variations in the load of the DC motor 123 are small.

In the tape cassette loading apparatus, since the eccentric gear 112 of the wiper arm 109R and the internal gear 114 of the drive rack 113 are provided so as to be in mesh with each other as described above, not only travelling speed and drive load of the cassette holder 101 during operation for loading the tape cassette 5 but drive load of the cassette holder 101 during an operation for ejecting the tape cassette 5 can be made uniform without the need for adding special components. Meanwhile, since the worm gear 122 having a displacement angle of 30° and being free from self-locking is employed, the tape cassette 5 can be depressed in the ejected state while being subjected to optimum reaction force, so that two drive racks and a spring stretched therebetween, which have been hitherto required to be provided, become unnecessary. Furthermore, depression of the tape cassette 5 can be detected by the mode switch 119 without using a special detector. Accordingly, such remarkable effects as reduction of the number of components, simplification of control and improvement of response can be achieved.

Figure 16:
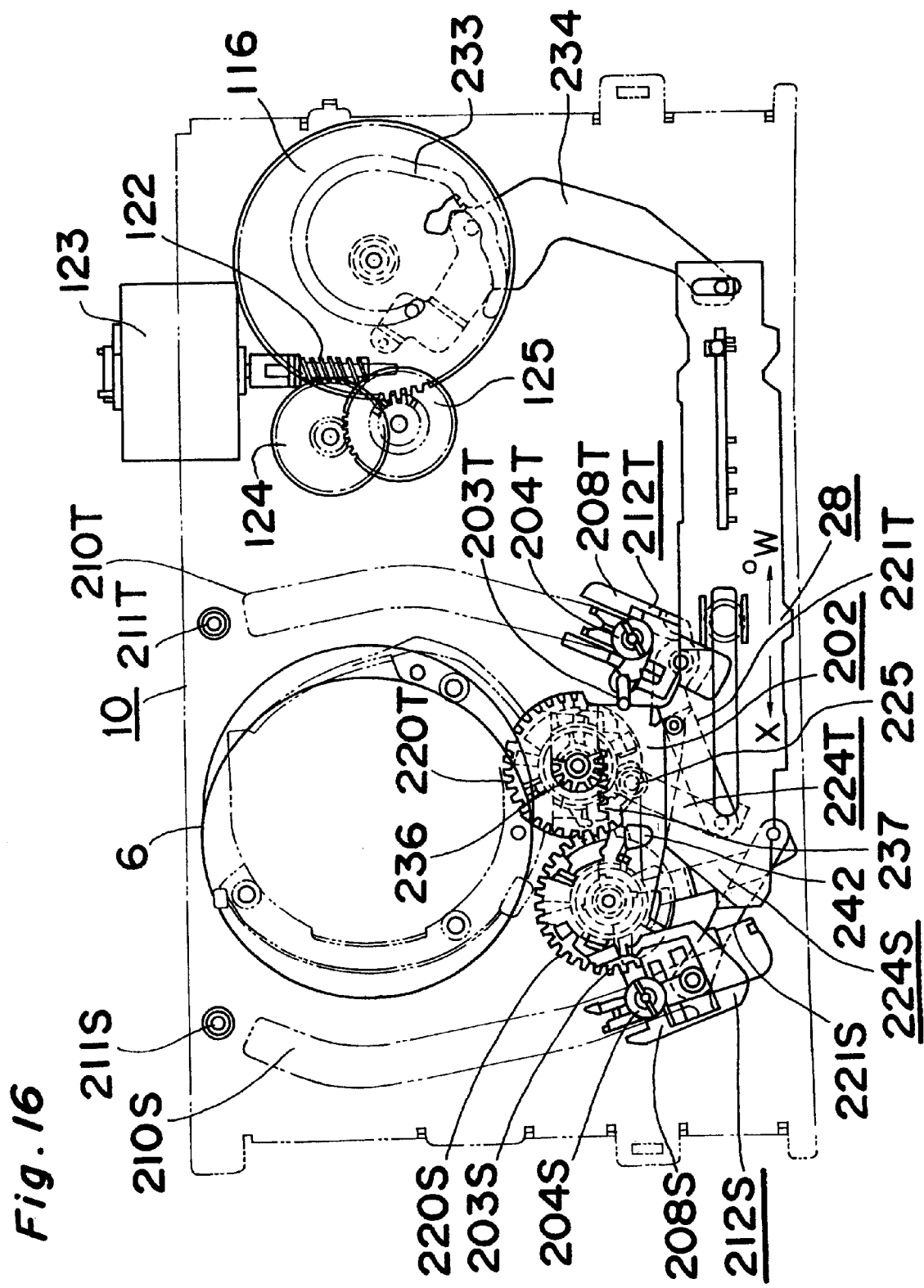
FIG. 16 is a top plan view showing a tape loading mechanism of the magnetic recording and reproducing system of FIG. 1 in an unloading state of a drive mechanism for driving the tape loading mechanism.
Figure 17:
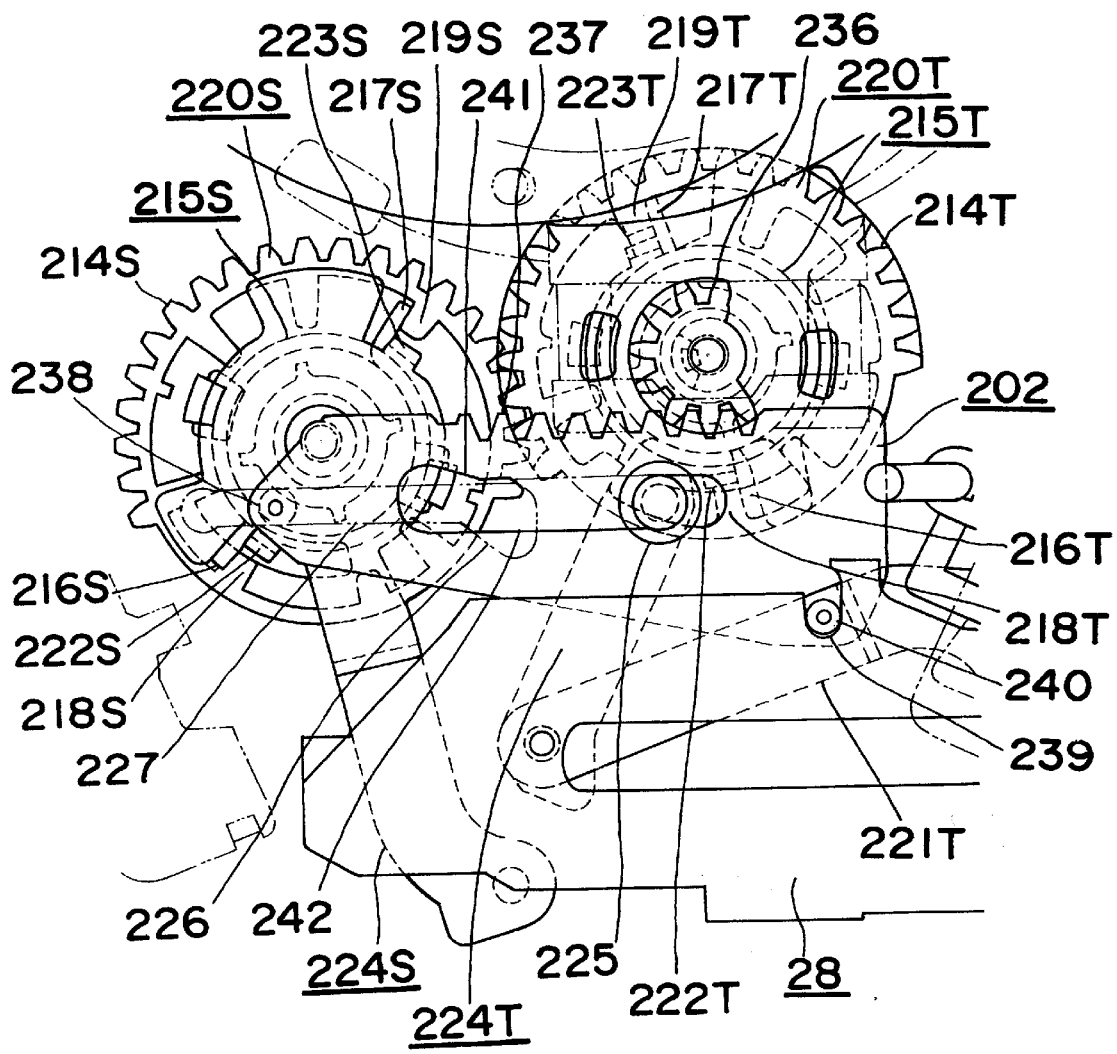
FIG. 17 is a fragmentary detail view of the tape loading mechanism of FIG. 16.

Then, arrangement and operation of a tape loading mechanism of the magnetic recording and reproducing system are described. FIG. 16 shows a state in which the magnetic tape 4 accommodated in the tape cassette 5 (not shown) is not drawn out of the tape cassette 5, (hereinafter, referred to as an "unloading state" of the magnetic tape 4). FIG. 17 shows a state in which the magnetic tape 4 is drawn out of the tape cassette 5 (not shown) and is wound around the cylinder 6 so as to enable recording and reproduction of signals by the magnetic head mounted on the cylinder 6, (hereinafter, referred to as a "loading state" of the magnetic tape 4. The tape loading mechanism includes tape guides 212S and 212T. An oblique post 203S and a roller post 204S are mounted at predetermined positions of a shaft holder 208S including a stopper 205S, 206S and a pin 207S. Likewise, an oblique post 203T and a roller post 204T are mounted at predetermined positions of a shaft holder 208T including a stopper 205T, 206T and a pin 207T. The tape guide 212S is movably mounted on the chassis 10 so as to be reciprocated until the stoppers 205S and 206S are stopped from the unloading state to the loading state along a loading groove 210S of the chassis 10 upon their contact with a stopper pin 211S erected on the chassis 10. Similarly, the tape guide 212T is movably mounted on the chassis 10 so as to be reciprocated until the stoppers 205T and 206T are stopped from the unloading state to the loading state along a loading groove 210T of the chassis 10 upon their contact with a stopper pin 211T erected on the chassis 10.

The tape loading mechanism further includes cylindrical loading gears 220S and 220T. The loading gears 220S and 220T are rotatably and axially oppositely mounted on loading gear shafts 213S and 213T erected on the chassis 10, respectively and include gear teeth 214S and 214T formed on their outer peripheries, respectively such that the gear teeth 214S and 214T are in mesh with each other.

The loading gear 220S includes engageable portions 218S and 219S engageable with hook portions 216S and 217S of a loading spring 215S acting as a first torsion spring. Likewise, the loading gear 220T includes engageable portions 218T and 219T engageable with hook portions 216T and 217T of a loading spring 215T acting as a second torsion spring.

The tape loading mechanism further includes first loading arms 221S and 221T each acting as one link member. A bore engageable with the pin 207S of the shaft holder 208S is formed at one end portion of the first loading arm 221S. Similarly, a bore engageable with the pin 207T of the shaft holder 208T is formed at one end portion of the first loading arm 221T.

The tape loading mechanism further includes second loading arms 224S and 224T each acting as the other link member. The second loading arms 224S and 224T are pivotally mounted so as to be pivoted relative to the loading gears 220S and 220T. One end portion of the second loading arm 224S has engageable portions 222S and 223S engageable with the hook portions 216S and 217S of the loading spring 215S, while the other end portion of the second loading arm 224S is pivotally coupled with the first loading arm 221S so as to be pivoted relative to the first loading arm 221S. Similarly, one end portion of the second loading arm 224T has engageable portions 222T and 223T engageable with the hook portions 216T and 217T of the loading spring 215T, while the other end portion of the second loading arm 224T is pivotally coupled with the first loading arm 221T so as to be pivoted relative to the first loading arm 221T.

Since the loading springs 215S and 215T function in the same manner, the function of only loading spring 215S is explained. Initially, the loading spring 215S is inserted into the loading gear 220S. At this time, the hook portions 216S and 217S of the loading spring 215S are, respectively, brought into engagement with the engageable portions 218S and 219S of the loading gear 220S such that a torque is applied to the loading spring 215S in an initial state. Then, the loading arm 224S is mounted on the loading gear 220S in which the loading spring 215S is fitted. The engageable portions 222S and 223S of the loading arm 224S are, respectively, disposed adjacent to the hook portions 216S and 217S of the loading spring 215S. Accordingly, when the loading gear 220S is further rotated in a state where the tape guide is stopped at a predetermined position at the time of completion of tape loading or at the time of completion of tape unloading, the hook portions 216S and 217S of the loading spring 215S, which have been held in engagement with the engageable portions 218S and 219S of the loading gear 220S, respectively, are brought into contact with the engageable portions 222S and 223S of the loading arm 224S, respectively so as to rotate the loading arm 224S in either direction.

The tape loading mechanism further includes a cassette positioning pin 225 for positioning the tape cassette 5 and a guide groove 227 formed on the chassis 10. The cassette positioning pin 225 is erected on the chassis 10 and acts also as a guide pin. The guide groove 227 has a cam portion 226.

The tape loading mechanism further includes the main cam gear 116 which is formed with a cam groove 233 and is rotationally driven by the DC motor 123 through the worm gear 122 mounted on the output shaft of the DC motor 123 and the first and second speed reduction gears L24 and 125. A cam groove 233 is formed on the main cam gear 116.

The tape loading mechanism further includes the main lever 28 which is driven by a drive arm 234 so as to be reciprocated linearly on the chassis 10, a rack 237 which is in mesh with a gear 236 provided on the loading gear 220T, a pin 238 of the loading rack 202, which is loosely fitted into the guide groove 227 and a pin 240 of the loading rack 202, which is brought into engagement with a slot portion 239 formed on the main lever 28.

The tape loading mechanism further includes a loading rack 202. The loading rack 202 has a guide groove 242 receiving loosely the cassette positioning pin 225 erected on the chassis 10. The guide groove 242 has a cam portion 241.

Operation of the tape loading mechanism of the above described arrangement is described with reference to FIGS. 16 to 19 and FIGS. 20A to 20E. The main lever 28 is moved in the directions of the arrows W and X of FIG. 16 in accordance with the operational modes of the magnetic recording and reproducing system and is driven by the DC motor 123 so as to be stopped at an arbitrary position. Initially, in operation for loading the magnetic tape 4, the main lever 28 is moved in the direction of the arrow W from the unloading state of FIG. 16. During period from FIG. 20A to FIG. 20C, the loading rack 202 is moved in the direction of the arrow W together with the main lever 28 through engagement of the pin 240 of the loading rack 202 with the slot portion 239 of the main lever 28 by functions of the pin 238 of the loading rack 202 in engagement with the guide groove 227 of the chassis 10 and the cassette positioning pin 225 of the chassis 10 in engagement with the guide groove 242 of the loading rack 202. Upon this travel of the loading rack 202, the gear 236 in mesh with the rack 237 is rotated and thus, the loading gear 220T provided integrally with the gear 236 is also rotated. At this time, the loading gear 220S in mesh with the loading gear 220T is also rotated. Therefore, the second loading arms 224S and 224T are pivoted together with the loading gears 220S and 220T through the loading gears 215S and 215T, respectively. Since the pins 207S and 207T of the tape guides 212S and 212T and circular end portions of the second loading arms 224S and 224T are coupled with the first loading arms 221S and 221T, respectively, the tape guides 212S and 212T are, respectively, displaced along the loading grooves 210S and 210T of the chassis 10 immediately prior to completion of loading of the magnetic tape 4.

Figure 20A:
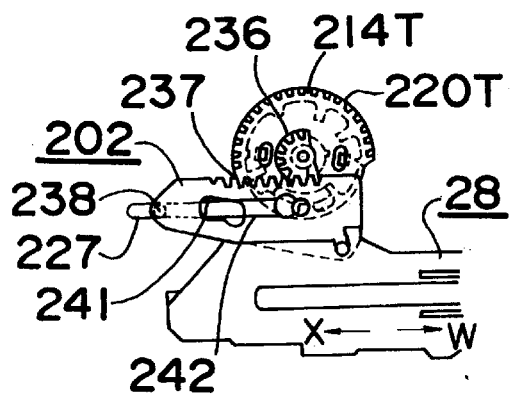
FIGS. 20A to 20E are views showing operation of the tape loading mechanism of FIG. 16.
Figure 20B:
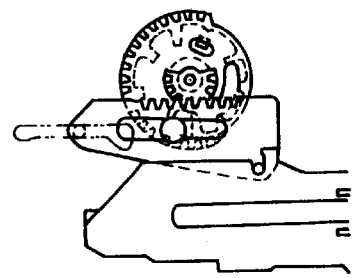
Figure 20C:
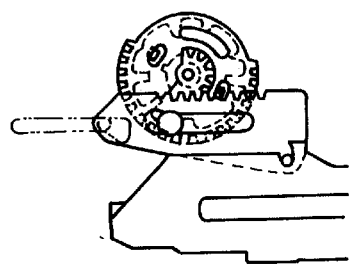
Figure 20D:
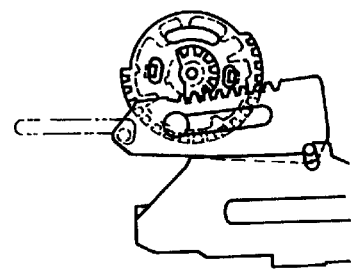
Figure 20E:
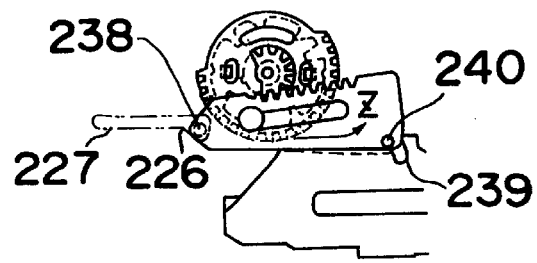

Subsequently, during period from FIG. 20C to FIG. 20E, the pin 238 of the loading rack 202 reaches the cam portion 226 of the guide groove 227 of the chassis 10 and the cam portion 241 of the guide groove 242 of the loading rack 202 reaches the cassette positioning pin 225 of the chassis 10, so that the loading rack 202 is displaced while being pivoted in the direction of the arrow Z of FIG. 20E and the pin 240 is disengaged from the slot portion 239 of the main lever 28 and thus, the loading rack 202 is stopped in spite of movement of the main lever 28. During this period, the second loading arms 224S and 224T are pivoted upon rotation of the loading gears 220S and 220T and are displaced until the stoppers 205S and 206S of the shaft holder 208S coupled with the first loading arm 221S and the stoppers 205T and 206T of the shaft holder 208T coupled with the first loading arm 221T come into contact with the stopper pins 211S and 211T, respectively. The loading gears 220S and 220T further continue to rotate but the second loading arms 224S and 224T are not capable of pivoting. Therefore, since forces of the loading springs 215S and 215T are applied to the second loading arms 224S and 224T, respectively, the tape guides 212S and 212T can be positioned at predetermined positions at predetermined attitude through the first loading arms 221S and 221T and the states of the tape guides 212S and 212T can be maintained after the loading rack 202 has been stopped. Subsequently, the main lever 28 is moved or stopped in accordance with the operational modes of the magnetic recording and reproducing system and is capable of controlling other mechanisms other than the tape loading mechanism, for example, a brake mechanism (not shown) for braking the reel base.

Figure 18:
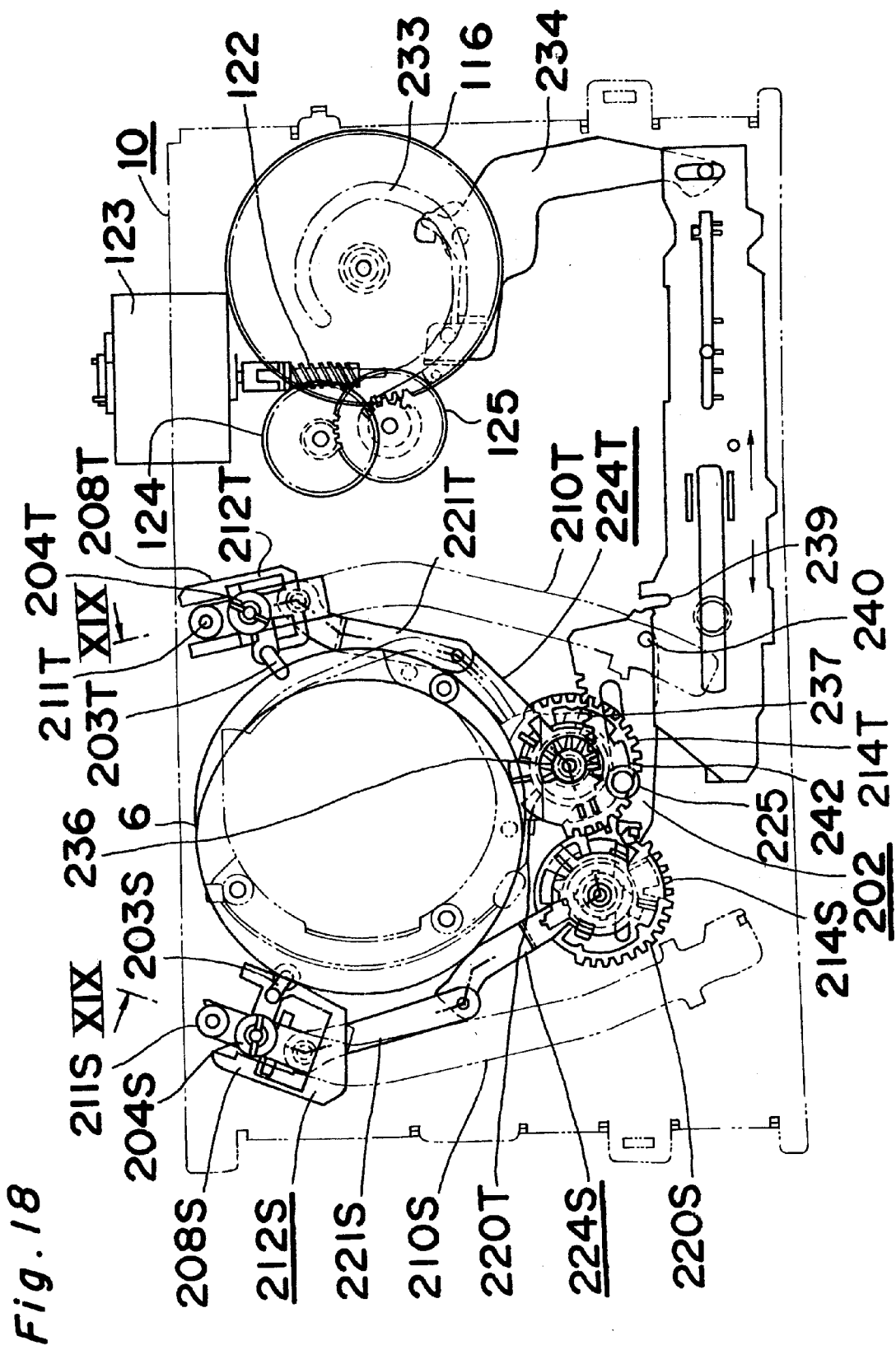
FIG. 18 is a top plan view showing the tape loading mechanism of FIG. 16 in a loading state of the drive mechanism.
Figure 19:
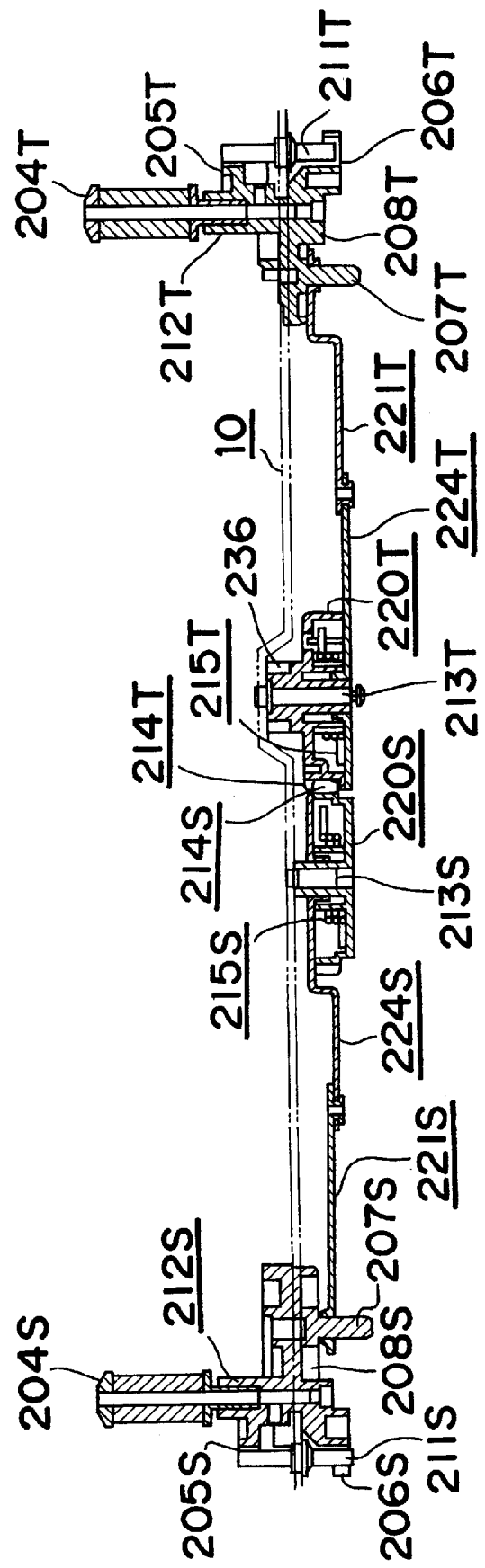
FIG. 19 is a sectional view taken along the line XIX—XIX in FIG. 18.

Then, in operation for unloading the magnetic tape 4, the main lever 28 is moved in the direction of the arrow X in FIG. 16 from the tape loading completion state of FIG. 18 and the tape guides 212S and 212T are held at the tape loading completion positions until the slot portion 239 of the main lever 28 is moved up to the pin 240 of the loading rack 202. After the slot portion 239 of the main lever 28 has been displaced up to the pin 240 of the loading rack 202, the main lever 28 is moved together with the loading rack 202 in the direction of the arrow X. This corresponds to FIG. 20D to FIG. 20A. As a result, the loading gears 220S and 220T are rotated in the directions opposite to those of tape loading operation. Thus, the tape guides 212S and 212T are moved from the tape loading completion position of FIG. 18 to the tape unloading position of FIG. 16 along the loading grooves 210S and 210T of the chassis 10 via the second loading arms 224S and 224T and the first loading arms 221S and 221T, respectively.

In the above mentioned tape loading mechanism, the tape loading gear 220T is rotationally driven by the loading rack 202 moving together with the main lever 28 and the tape 212S and 212T are moved from the unloading positions to the loading positions through the loading gears 220S and 220T, the second loading arms 224S and 224T and the first loading arms 221S and 221T. Then, the loading rack 202 is stopped in spite of movement of the main lever 28 by functions of the cam portion 226 of the guide groove 27 of the chassis 10, etc. and the tape guides 212S and 212T are held at the loading positions. Accordingly, in operation for loading the magnetic tape 4, especially, drive load required for bringing the tape guides 212S and 212T into pressing contact with the stopper pins 211S and 211T, respectively is reduced and load required for holding the tape guides 212S and 212T at the pressing contact positions after completion of pressing contact of the tape guides 212S and 212T with the stopper pins 211S and 211T is reduced. Meanwhile, by reducing load applied to the main lever 28 and employing the loading rack 202, the main lever 28 can be made more compact and thinner. Furthermore, since the loading gears 220S and 220T are, respectively, axially oppositely mounted on the loading gear shafts 213S and 213T erected on the chassis 10, the loading springs 215S and 215T may be formed by torsion springs having an identical shape, so that the loading springs 215S and 215T can be used in common with each other.

What is claimed is:

1. A tape loading apparatus for loading a magnetic tape accommodated in a tape cassette, said apparatus comprising:
    a chassis including a guide pin and a guide groove having a cam portion;
    a first tape guide means movably mounted on said chassis so as to be displaceable from a first position to a second position in order to partially draw out the magnetic tape from the tape cassette so that signals can be recorded on or reproduced from the magnetic tape;
    a first cylindrical member pivotally mounted on a shaft secured to said chassis and having a first gear portion;
    a first link means for linking said first tape guide means and said first cylindrical member such that pivotal movement of said first cylindrical member is converted into displacement of said first tape guide means between the first and second positions;
    a drive member mounted on said chassis so as to be linearly movable thereon, said drive member having an engageable portion; and
    a motion member including a rack portion in mesh with said gear portion of said first cylindrical member, a first pin loosely received in said guide groove of said chassis, a second pin engageable with said engageable portion of said drive member, and a guide groove receiving said guide pin of said chassis,
    wherein, when said motion member is displaced together with said drive member, said first cylindrical member is rotationally driven so as to drive said first tape guide means from the first position to the vicinity of the second position,
    wherein, after said first tape guide means reaches the second position, said first pin of said motion member reaches said cam portion of the guide groove formed in said chassis, and said second pin of said motion member is disengaged from said engageable portion of said drive member in order to stop displacement of said motion member and hold said first tape guide means at the second position.

2. A tape loading apparatus as claimed in claim 1, wherein said guide pin fixed on said chassis also functions as a cassette positioning pin.

3. A tape loading apparatus as claimed in claim 2, wherein said first link means comprises:

a first link having a first end portion engageable with said first tape guide means and a second end portion; and a second link having a first end portion pivotally connected to said second end portion of said first link, and a second end portion pivotally mounted on said shaft upon which said first cylindrical member is pivotally mounted.

4. A tape loading apparatus as claimed in claim 3, wherein said first cylindrical portion further includes a second gear portion formed on the outer periphery thereof, and the tape loading apparatus further comprises:

a second tape guide means movably mounted on said chassis so as to be displaceable from a first position to a second position in order to partially draw out the magnetic tape from the tape cassette so that signals can be recorded on or reproduced from the magnetic tape;

a second cylindrical member including a gear portion in mesh with said second gear portion of said first cylindrical member, wherein said second cylindrical member is pivotally mounted on a shaft secured to said chassis and is pivoted in response to pivotal movement of said first cylindrical member; and a second link means for linking said second tape guide means and said second cylindrical member such that pivotal movement of said second cylindrical member is converted into displacement of said second tape guide means between the first and second positions thereof.

5. A tape loading apparatus as claimed in claim 4, wherein said second link means comprises:

a first link having a first end portion engageable with said second tape guide means and a second end portion; and a second link having a first end portion pivotally connected to said second end portion of said first link, and a second end portion pivotally mounted on said shaft upon which said second cylindrical member is pivotally mounted.

6. A tape loading apparatus as claimed in claim 1, wherein said first link means comprises:

a first link having a first end portion engageable with said first tape guide means and a second end portion; and a second link having a first end portion pivotally connected to said second end portion of said first link, and a second end portion pivotally mounted on said shaft upon which said first cylindrical member is pivotally mounted.

7. A tape loading apparatus as claimed in claim 6, wherein said first cylindrical portion further includes a second gear portion formed on the outer periphery thereof, and the tape loading apparatus further comprises:

a second tape guide means movably mounted on said chassis so as to be displaceable from a first position to a second position in order to partially draw out the magnetic tape from the tape cassette so that signals can be recorded on or reproduced from the magnetic tape;

a second cylindrical member including a gear portion in mesh with said second gear portion of said first cylindrical member, wherein said second cylindrical member is pivotally mounted on said chassis and is pivoted in response to pivotal movement of said first cylindrical member; and a second link means for linking said second tape guide means and said second cylindrical member such that pivotal movement of said second cylindrical member is converted into displacement of said second tape guide means between the first and second positions thereof.

8. A tape loading apparatus as claimed in claim 7, wherein said second link means comprises:

a first link having a first end portion engageable with said second tape guide means and a second end portion; and a second link having a first end portion pivotally connected to said second end portion of said first link, and a second end portion pivotally mounted on said shaft upon which said second cylindrical member is pivotally mounted.

9. A tape loading apparatus for loading a magnetic tape accommodated in a tape cassette, said apparatus comprising:

a chassis;

a first tape guide means movably mounted on said chassis so as to be displaceable from a first position to a second position in order to partially draw out the magnetic tape from the tape cassette so that signals can be recorded on or reproduced from the magnetic tape;

a first cylindrical member rotatably mounted on said chassis, said first cylindrical member including a first gear portion formed on an outer periphery thereof and two rib portions;

a first torsion spring mounted on said first cylindrical member and including two hook portions;

a first link means coupled to said first tape guide means and said first cylindrical member, said first link means having a first end portion which is engageable with one of said hook portions of said first torsion spring, wherein said first link means is pivotably through a predetermined angle relative to said first cylindrical member and rotation of said first cylindrical member pivots said first link means via said first torsion spring;

a second tape guide means movably mounted on said chassis so as to be displaceable from a first position to a second position in order to partially draw out the magnetic tape from the tape cassette so that signals can be recorded on or reproduced from the magnetic tape;

a second cylindrical member rotatably mounted on said chassis, said second cylindrical member including a second gear portion formed on an outer periphery thereof and two rib portions;

a second torsion spring mounted on said second cylindrical member and including two hook portions which are engageable with said two rib portions of said second cylindrical member, wherein said second torsion spring has a shape which is identical to the shape of said first torsion spring; and a second link means coupled to said first tape guide means and said first cylindrical member, said first link means having a first end portion which is engageable with one of the hook portions of said second torsion spring, wherein said second link means is pivotable through a predetermined angle relative to said second cylindrical member and rotation of said second cylindrical member pivots said second link means via said second torsion spring.

10. A tape loading apparatus as claimed in claim 9, wherein:

said first link means includes a link coupled to said first tape guide means and a further link pivotally mounted on a pivotal center of said first cylindrical member, and said second link means includes a link coupled to said second tape guide means and a further link pivotally mounted on a pivotal center of said second cylindrical member.

11. A tape loading apparatus for loading a magnetic tape accommodated in a tape cassette, said apparatus comprising:

a chassis including a guide pin and a guide groove having a cam portion;

a first tape guide movably mounted on said chassis so as to be displaceable from a first position to a second position in order to partially draw out the magnetic tape from the tape cassette so that signals can be recorded on or reproduced from the magnetic tape;

a first loading gear pivotally mounted on a shaft secured to said chassis, said first loading gear having a first gear and a second gear;

a first linking device coupling said first tape guide and said first loading gear such that pivotal movement of said first loading gear is converted into displacement of said first tape guide between the first and second positions of said first tape guide;

a drive rack including a rack portion in mesh with said gear teeth of said first gear of said first loading gear, a first pin loosely received in said guide groove of said chassis, a second pin, and a guide groove, wherein said guide pin of said chassis is received in said guide groove of said drive rack, a drive arm mounted on said chassis; and a linear motion member disposed on said chassis so as to be reciprocated linearly by said drive arm, wherein said linear motion member defines a slot portion, and said second pin of said drive rack is engageable in said slot portion, wherein, when said drive rack is displaced together with said drive member by said drive arm, said first loading gear is rotationally driven so as to drive said first tape guide from the first position toward the second position, wherein, after said first tape guide reaches the second position, said first pin of said drive rack reaches said cam portion of said guide groove formed in said chassis, and said second pin of said drive rack is disengaged from said slot portion of said linear motion member in order to stop displacement of said drive rack and hold said first tape guide the second position.

12. A tape loading apparatus as claimed in claim 11, wherein said guide pin of said chassis also functions as a cassette positioning pin.

13. A tape loading apparatus as claimed in claim 12, wherein said first linking device comprises:

a first link having a first end portion coupled to said first tape guide and a second end portion; and a second link having a first end portion pivotally connected to said second end portion of said first link, and a second end portion pivotally mounted on said shaft upon which said first loading gear is pivotally mounted.

14. A tape loading apparatus as claimed in claim 13, wherein said first loading gear further includes a second gear, and the tape loading apparatus further comprises:

a second tape guide movably mounted on said chassis so as to be displaceable from a first position to a second position in order to partially draw out the magnetic tape from the tape cassette so that signals can be recorded on or reproduced from the magnetic tape;

a second loading gear pivotally mounted on a shaft secured to said chassis, said second loading gear having a first gear in mesh with said second gear of said first loading gear, wherein said second loading gear is pivotally mounted on said chassis and is pivoted in response to pivotal movement of said first loading gear; and a second linking device coupling said second tape guide and said second loading gear such that pivotal movement of said second loading gear is converted into displacement of said second tape guide between the first and second positions of said second tape guide.

15. A tape loading apparatus as claimed in claim 14, wherein said second linking device comprises:

a first link having a first end portion coupled to said second tape guide and a second end portion; and a second link having a first end portion pivotally connected to said second end portion of said first link, and a second end portion pivotally mounted on said shaft upon which said second loading gear is pivotally mounted.

16. A tape loading apparatus as claimed in claim 11, wherein said first linking device comprises:

a first link having a first end portion coupled to said first tape guide and a second end portion; and a second link having a first end portion pivotally connected to said second end portion of said first link, and a second end portion pivotally mounted on said shaft upon which said first loading gear is pivotally mounted.

17. A tape loading apparatus as claimed in claim 16, wherein said first loading gear further includes a second gear, and the tape loading apparatus further comprises:

a second tape guide movably mounted on said chassis so as to be displaceable from a first position to a second position in order to partially draw out the magnetic tape from the tape cassette so that signals can be recorded on or reproduced from the magnetic tape;

a second loading gear pivotally mounted on a shaft secured to said chassis, said second loading gear having a first gear in mesh with said second gear of said first loading gear, wherein said second loading gear is pivotally mounted on said chassis and is pivoted in response to pivotal movement of said first loading gear; and a second linking device coupling said second tape guide and said second loading gear such that pivotal movement of said second loading gear is converted into displacement of said second tape guide between the first and second positions of said second tape guide.

18. A tape loading apparatus as claimed in claim 17, wherein said second linking device comprises:

a first link having a first end portion coupled to said second tape guide and a second end portion; and a second link having a first end portion pivotally connected to said second end portion of said first link, and a second end portion pivotally mounted on said shaft upon which said second loading gear is pivotally mounted.

* * * * *